United States Patent [19]

Kitaguchi et al.

[11] Patent Number: 4,473,632
[45] Date of Patent: Sep. 25, 1984

[54] HEAT-DEVELOPABLE COLOR PHOTOGRAPHIC MATERIAL

[75] Inventors: Hiroshi Kitaguchi; Kozo Sato; Shinsaku Fujita; Hideki Naito, all of Kanagawa, Japan

[73] Assignee: Fuji Photo Film Co., Ltd., Kanagawa, Japan

[21] Appl. No.: 566,450

[22] Filed: Dec. 28, 1983

[30] Foreign Application Priority Data

Dec. 29, 1982 [JP] Japan .................. 57-230911

[51] Int. Cl.³ .................. G03C 5/54; G03C 7/00; G03C 1/10
[52] U.S. Cl. .................. 430/203; 430/223; 430/562
[58] Field of Search .............. 430/203, 223, 562, 351, 430/617, 619

[56] References Cited

U.S. PATENT DOCUMENTS

| 3,954,476 | 5/1976 | Krutak et al. | 430/223 |
| 4,156,609 | 5/1979 | Landholm et al. | 430/223 |
| 4,430,415 | 2/1984 | Aono et al. | 430/203 |
| 4,439,513 | 3/1984 | Sato et al. | 430/203 |

FOREIGN PATENT DOCUMENTS 0066282 2/1982 European Pat. Off. ............ 430/203

Primary Examiner—Richard L. Schilling
Attorney, Agent, or Firm—Sughrue, Mion, Zinn, Macpeak & Seas

[57] ABSTRACT

A heat-developable color photographic material is disclosed. The material is comprised of a support having thereon a light-sensitive silver halide, a hydrophilic binder and a dye releasing redox compound represented by the general formula (I):

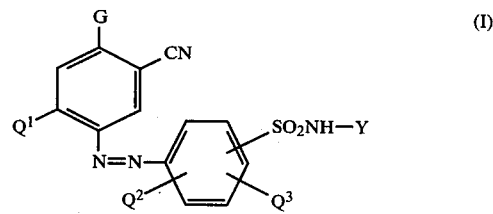

the substituents within the general formula (I) are disclosed within the specification. The heat-developable color photographic material can easily provide a clear and stable color image by imagewise exposure to light and a heat-development procedure. A method of forming a color image using the heat-developable color photographic material is also disclosed.

57 Claims, No Drawings

HEAT-DEVELOPABLE COLOR PHOTOGRAPHIC MATERIAL

FIELD OF THE INVENTION

The present invention relates to a process of forming a color image by heat-development. Particularly, the present invention relates to a novel dye releasing redox compound suitable for use in a novel process for obtaining a color image by heat diffusion transfer of a dye released upon heat-development of a heat-developable color photographic material containing a dye releasing redox compound which releases a diffusible dye upon heat-development into a support capable of receiving a dye.

BACKGROUND OF THE INVENTION

Photographic processes using silver halide have been most widely used in the past due to their excellent photographic properties such as sensitivity or control of gradation, etc., as compared with other photographic processes, such as an electrophotographic process or a diazo photographic process. In recent years, with respect to image formation processes for photographic materials using silver halide, many techniques capable of easily and quickly obtaining images have been developed by changing the conventional wet process using a developing solution into a dry development process such as a process using heat, etc.

Heat-developable photographic materials are known in the field of these techniques. Heat-developable photographic materials and processes therefor have been described in U.S. Pat. Nos. 3,152,904, 3,301,678, 3,392,020 and 3,457,075, British Pat. Nos. 1,131,108 and 1,167,777, and *Research Disclosure*, No. 17029, pages 9 to 15 (June, 1978).

Many different processes for obtaining color images have been proposed. With respect to processes for forming color images by the reaction of an oxidation product of a developing agent with a coupler, it has been proposed to use a p-phenylenediamine type reducing agent and a phenolic coupler or an active methylene coupler as described in U.S. Pat. No. 3,531,286, a p-aminophenol type reducing agent as described in U.S. Pat. No. 3,761,270, a sulfonamidophenol type reducing agent as described in Belgian Pat. No. 802,519 and *Research Disclosure*, pages 31 and 32 (Sept., 1975) and the combination of a sulfonamidophenol type reducing agent and a 4-equivalent coupler as described in U.S. Pat. No. 4,021,240.

These processes, however, are disadvantageous in that turbid color images are formed, because a reduced silver image and a color image are simultaneously formed on the exposed area after heat-development. In order to eliminate these disadvantages, there have been proposed a process which comprises removing a silver image by liquid processing or a process which comprises transferring only the dye to another layer, for example, a sheet having an image receiving layer. However, the latter process is not desirable because it is not easy to transfer only the dye as distinguishable from unreacted substances.

Another process which comprises introducing a nitrogen containing heterocyclic group into a dye, forming a silver salt and releasing a dye by heat-development has been described in *Research Disclosure*, No. 16966, pages 54 to 58 (May, 1978). According to this process, clear images cannot be obtained, because it is difficult to control the release of dyes from nonexposed areas, and thus it is not a conventionally applicable process.

Also, processes for forming a positive color image by a silver dye bleach process utilizing heat-development, with useful dyes and methods for bleaching have been described, for example, in *Research Disclosure*, No. 14433, pages 30 to 32 (April, 1976), ibid., No. 15227, pages 14 and 15 (Dec., 1976) and U.S. Pat. No. 4,235,957.

However, this process requires an additional step and an additional material for accelerating bleaching of dyes, for example, heating with a superposed sheet with an activating agent. Furthermore, it is not desirable because the resulting color images are gradually reduced and bleached by coexisting free silver during long periods of preservation.

Moreover, a process for forming a color image utilizing a leuco dye has been described, for example, in U.S. Pat. Nos. 3,985,565 and 4,022,617. However, this process is not desirable because it is difficult to stably incorporate the leuco dye in the photographic material and coloration gradually occurs during preservation.

SUMMARY OF THE INVENTION

The present invention provides a novel process for forming a color image by heat-development, eliminating the drawbacks present in known materials.

Therefore, an object of the present invention is to provide a novel dye releasing redox compound suitable for use in a novel process for forming a color image which comprises heat transferring a hydrophilic dye released upon heat-development into an image receiving material containing a mordant to obtain a color image.

Another object of the present invention is to provide a dye releasing redox compound, for obtaining a clear color image by a simple procedure.

Still another object of the present invention is to provide a dye releasing redox compound for obtaining a color image which is stable for a long period of time.

These and other objects of the present invention will become more apparent from the following detailed description and examples.

These objects of the present invention are accomplished with a heat-developable color photographic material comprising a support having thereon at least a light-sensitive silver halide, a hydrophilic binder and a dye releasing redox compound which is reducing with respect to the silver halide and capable of releasing a hydrophilic dye and represented by the following general formula (I):

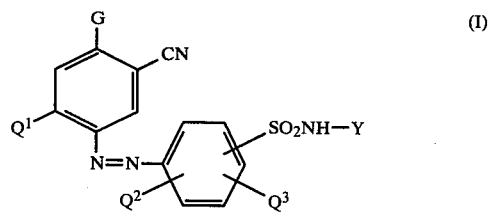

wherein $Q^1$ represents a hydrogen atom, a halogen atom, an alkoxy group, a substituted alkoxy group, an acylamino group represented by the formula —NHCOR$^1$ (wherein R$^1$ represents an alkyl group, a substituted alkyl group, an alkoxy group, a substituted alkoxy group, an amino group, a substituted amino group, an aryl group or a substituted aryl group) or a sulfonylamino group represented by the formula —NH—SO$_2$R$^1$ (wherein R$^1$ has the same meaning as defined above); Q$^2$ and Q$^3$, which may be the same or different, each represents a hydrogen atom, a halogen atom, an alkyl group, a substituted alkyl group, an alkoxy group, a substituted alkoxy group or an amino group represented by the formula

(wherein R$^2$ and R$^3$, which may be the same or different, each represents an alkyl group or a substituted alkyl group or R$^2$ and R$^3$ may combine with each other and represent an atomic group necessary to form a 5-membered or 6-membered heterocyclic ring); G represents a hydroxy group or a group capable of providing a hydroxy group upon hydrolysis; and Y represents a group represented by the following general formulae (II) to (IX):

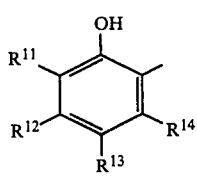 (II)

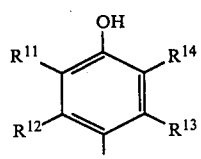 (III)

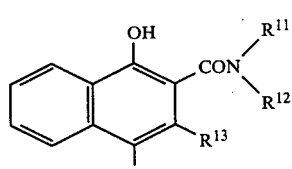 (IV)

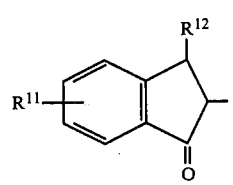 (V)

(VI)

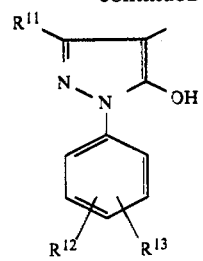 VII)

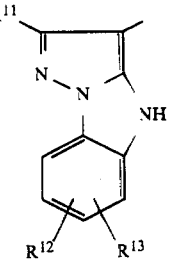 VIII)

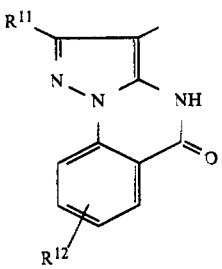 IX)

wherein R$^{11}$, R$^{12}$, R$^{13}$ and R$^{14}$ each represents a hydrogen atom or a substituent selected from an alkyl group, a cycloalkyl group, an aryl group, an alkoxy group, an aryloxy group, an aralkyl group, an acyl group, an acylamino group, an alkylsulfonylamino group, an arylsulfonylamino group, an aryloxyalkyl group, an alkoxyalkyl group, an N-substituted carbamoyl group, an N-substituted sulfamoyl group, a halogen atom, an alkylthio group or an arylthio group, and the alkyl moiety and the aryl moiety in the above-described substituents may be further substituted with an alkoxy group, a halogen atom, a hydroxy group, a cyano group, an acyl group, an acylamino group, a substituted carbamoyl group, a substituted sulfamoyl group, an alkylsulfonylamino group, an arylsulfonylamino group, a substituted ureido group or a carboalkoxy group, and the hydroxy group and the amino group included in Y may be protected by a protective group capable of reproducing the hydroxy group and the amino group by the action of a nucleophilic agent.

DETAILED DESCRIPTION OF THE INVENTION

The heat-developable color photographic material of the present invention can simultaneously provide a silver image having a negative-positive relationship to the original and a diffusible dye on the part corresponding to the silver image utilizing only heat-development after imagewise exposure to light. That is, when the heat-developable color photographic material of the present invention is imagewise exposed to light and developed by heating, an oxidation-reduction reaction occurs between an exposed light-sensitive silver halide and a reducing dye releasing redox compound to form a silver image in the exposed area. In this step, the dye releasing redox compound is oxidized by the silver halide to form an oxidized product. This oxidized product is cleaved in the presence of a dye releasing activator and consequently the hydrophilic diffusible dye is released. Accordingly, the silver image and the diffusible dye are formed in the exposed area, and a color image is obtained by transferring the diffusible dye.

The reaction of releasing a diffusible dye according to the present invention is completed in a dry film under high temperature. This releasing reaction of a diffusible dye is believed to be a reaction by the so-called attack with a nucleophilic agent and is usually carried out in a liquid. In the present invention, the dye releasing redox compounds generally show a high reaction rate even in the dry film, although the rate varies depending on a kind of the dye releasing redox compounds. The reaction rates found were unexpectedly high. Further, the dye releasing redox compound according to the present invention can undergo an oxidation-reduction reaction with silver halide without the assistance of the so-called auxiliary developing agent. This is also an unexpected result based on previous information of what may happen at ambient temperature.

Of the dye releasing redox compounds represented by the general formula (I) according to the present invention, those represented by the following general formula (Ia), (Ib) or (Ic) are particularly preferred.

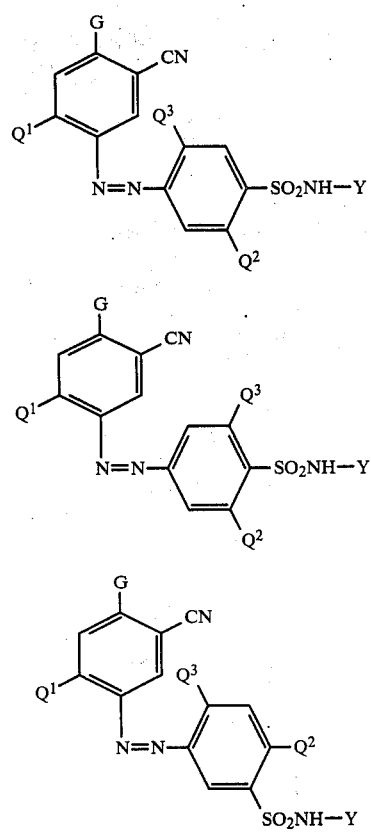

wherein $Q^1$, $Q^2$, $Q^3$, G and Y each has the same meaning as defined above.

In the above-described general formula (Ia), the compound is characterized by the presence of the 2-cyanophenol or a derivative thereof as a coupling component. Due to the use of the 2-cyanophenol or a derivative thereof, a molecular weight of the compound is remarkably reduced in comparison with a compound having a 1-phenyl-3-cyano-5-pyrazolone as a coupling component as described in Japanese patent application (OPI) No. 7727/77 (the term "OPI" as used herein refers to a "published unexamined Japanese patent application"), etc. Thus, the diffusibility of the dye is improved and in addition the dye has a large molecular extinction coefficient. As a result, it is possible to obtain a yellow dye image having a high density in a short period of time upon heat-development. Furthermore, it is observed that the light fastness of the transferred image is markedly improved and thus the durability of color image in a light place is extremely improved.

The yellow dye releasing redox compound according to the present invention is described in greater detail below.

$Q^1$ preferably represents a hydrogen atom, a halogen atom (for example, a chlorine atom, etc.), an alkoxy group having from 1 to 8 carbon atoms and more preferably from 1 to 4 carbon atoms (for example, a methoxy group, an ethoxy group, an n-propyloxy group, etc.), a substituted alkoxy group having from 1 to 10 carbon atoms and more preferably from 1 to 5 carbon atoms in total substituted with an alkoxy group or a halogen atom, etc. (for example, a methoxyethoxy group, a methoxyethoxyethoxy group, a chloroethoxy group, etc.), an acylamino group represented by the formula $-NHCOR^1$ or a sulfonylamino group represented by the formula $-NHSO_2R^1$. In the above formulae $R^1$ preferably represents an alkyl group having from 1 to 8 carbon atoms and more preferably from 1 to 4 carbon atoms, a substituted alkyl group having from 1 to 8 carbon atoms and more preferably from 1 to 4 carbon atoms in the alkyl moiety, an alkoxy group having from 1 to 8 carbon atom and more preferably from 1 to 4 carbon atoms, a substituted alkoxy group having from 1 to 10 carbon atoms and more preferably from 1 to 5 carbon atoms in total, an amino group, a substituted amino group substituted with an alkyl group or a substituted alkyl group each having from 1 to 10 carbon atoms and more preferably from 1 to 5 carbon atoms, a phenyl group or a substituted phenyl group having from 6 to 9 carbon atoms.

$Q^2$ and $Q^3$ each preferably represents a hydrogen atom, a halogen atom (for example, a chlorine atom, etc.), an alkyl group having from 1 to 8 carbon atoms and more preferably from 1 to 4 carbon atoms (for example, a methyl group, an ethyl group, an n-propyl group, an isopropyl group, an n-butyl group, etc.), a substituted alkyl group having from 1 to 10 carbon atoms and more preferably from 1 to 5 carbon atoms in total substituted with an alkoxy group or a halogen atom, etc. (for example, a methoxyethoxyethyl group, a methoxyethyl group, a chloroethyl group, etc.), an alkoxy group having from 1 to 8 carbon atoms and more preferably from 1 to 4 carbon atoms (for example, a methoxy group, an ethoxy group, an n-propyloxy group, an n-butyloxy group, etc.), a substituted alkoxy group having from 1 to 10 carbon atoms and more preferably from 1 to 5 carbon atoms in total substituted with an alkoxy group or a halogen atom, etc. (for example, a methoxyethoxy group, a methoxyethoxyethoxy group, a chloroethoxy group, etc.) or an amino group represented by the formula

The alkyl group or the substituted alkyl group represented by $R^2$ and $R^3$ can be a straight chain, branched chain or cyclic alkyl group. Preferred examples include an alkyl group having from 1 to 6 carbon atoms and more preferably from 1 to 4 carbon atoms (for example, a methyl group, an ethyl group, an n-propyl group, an isopropyl group, an n-butyl group, a cyclohexyl group, etc.), a substituted alkyl group having from 1 to 10 carbon atoms and more preferably from 1 to 5 carbon atoms in total substituted with an alkoxy group or a halogen atom, etc. (for example, a methoxyethyl group, a methoxyethoxyethyl group, a chloroethyl group, etc.) and the like.

Further, the atomic groups necessary to form a 5-membered or 6-membered heterocyclic ring by connecting $R^2$ and $R^3$ include carbon atom chains such as an alkylene group having from 4 to 6 carbon atoms (for example, an alkylene group capable of forming a 5-membered or 6-membered ring together with the nitrogen atom such as $-(CH_2)_4-$, $-(CH_2)_5-$, $-CH_2CH_2CH_2CH_2CH(CH_3)-$, $-CH_2CH_2CH_2CH(CH_3)CH_2-$ or $-CH_2CH_2CH(CH_3)CH_2CH_2-$), etc., and carbon atom chains including an oxygen atom such as $-CH_2CH_2-O-CH_2CH_2-$ or $-CH_2CH(CH_3)-O-CH(CH_3)CH_2-$, etc.

Examples of G include a hydroxy group or a salt thereof such as an alkali metal salt (for example, $-O^-Li^+$, $-O^-K^+$ or $-O^-Na^+$) or a photographically inert ammonium salt (for example, $-O^-NH_4^+$, $-O^-NH(CH_3)_3^+$, $-O^-N(C_2H_5)_4^+$, etc.). G also represents a hydrolyzable acyloxy group represented by the formula

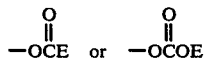

wherein E represents an alkyl group, a substituted alkyl group, a phenyl group or a substituted phenyl group. Examples of the hydrolyzable acyloxy groups include, for example,

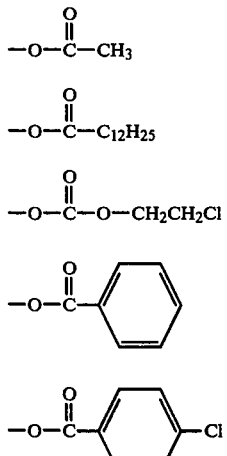

-continued

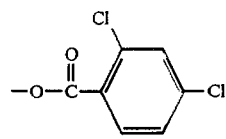

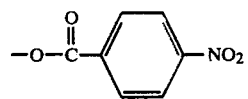

etc., but should not be limited thereto.

Characteristics required for the reducing group Y are as follows.

1. It is rapidly oxidized by the silver halide to effectively release a diffusible dye for image formation by the function of the dye releasing activator.
2. The reducing group Y has an extensive hydrophobic property, because it is necessary for the dye releasing redox compound to be immobilized in a hydrophilic or hydrophobic binder and that only the released dye have diffusibility.
3. It has excellent stability to heat and does not release the image forming dye until it is oxidized; and
4. It is easily synthesized.

In the following, specific examples of preferred reducing groups Y which satisfy the above-described requirements are shown. In the example, -(chemical bond) represents the bond to the dye portion.

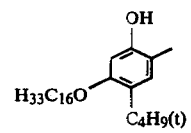

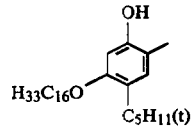

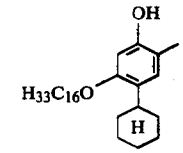

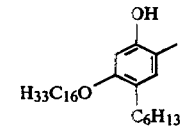

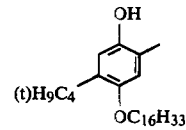

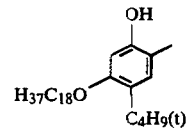

-continued

Furthermore, the groups described in U.S. Pat. No. 4,055,428, Japanese patent application (OPI) Nos. 12642/81, 16130/81, 16131/81, 650/82 and 4043/82, U.S. Pat. Nos. 3,928,312, 4,076,529, 4,135,929, 4,258,120, 4,053,312 and 4,198,235, Japanese patent application (OPI) No. 46730/78, U.S. Pat. Nos. 4,273,855 and 4,149,892, U.S. published patent application B 351,673, Research Disclosure, Vol. 130, No. 13024 (February, 1975), etc., are useful as the reducing group.

The group represented by Y preferably contains a ballast group. The ballast group is an organic ballast group capable of rendering the dye releasing redox compound non-diffusible during heat-development and preferably is or contains a hydrophobic group having from 8 to 32 carbon atoms. Such an organic ballast group can be bonded to the dye releasing redox compound directly or through a linking group, for example, an imino bond, an ether bond, a thioether bond, a carbon-amido bond, a sulfonamido bond, a ureido bond, an ester bond, an imido bond, a carbamoyl bond, a sulfamoyl bond, etc., alone or in combination thereof.

Specific examples of ballast groups are illustrated below.

An alkyl group or an alkenyl group (for example, a dodecyl group, an octadecyl group, etc.), an alkoxyalkyl group (for example, a 3-(octyloxy)propyl group, a 3-(2-ethylundecyloxy)propyl group, etc., as described in Japanese patent publication No. 27563/64, etc.), an alkylaryl group (for example, a 4-nonylphenyl group, a 2,4-di-tert-butylphenyl group, etc.), and alkylaryloxyalkyl group (for example, a 2,4-di-tert-pentylphenoxymethyl group, an α-(2,4-di-tert-pentylphenoxy)propyl group, a 1-(3-pentadecylphenoxy)ethyl group, etc.), an acylamidoalkyl group (for example, a group described in U.S. Pat. Nos. 3,337,344 and 3,418,129, a 2-(N-butyl-hexadecanamido)ethyl group, etc.), an alkoxyaryl or aryloxyaryl group (for example, a 4-(n-octadecyloxy)phenyl group, a 4-(4-n-dodecylphenyloxy)phenyl group, etc.), a residue containing both an alkyl or alkenyl long-chain aliphatic group and a water-solubilizing group such as a carboxy group or a sulfo group (for example, a 1-carboxymethyl-2-nonadecenyl group, a 1-sulfoheptadecyl group, etc.), an alkyl group substituted with an ester group (for example, a 1-ethoxycarbonylheptadecyl group, a 2-(n-dodecyloxycarbonyl)ethyl group, etc.), an alkyl group substituted with an aryl group or a heterocyclic group (for example, a 2-[4-(3-methoxycarbonyluneicosanamido)phenyl]ethyl group, a 2-[4-(2-n-octadecylsuccinimido)phenyl]ethyl group, etc.), and an aryl group substituted with an aryloxyalkoxycarbonyl group (for example, a 4-[2-(2,4-di-tert-pentylphenoxy)-2-methylpropyloxycarbonyl]phenyl group, etc.).

Specific examples of dye releasing redox compounds according to the present invention are illustrated below. However, the present invention should not be construed as being limited to these specific examples.

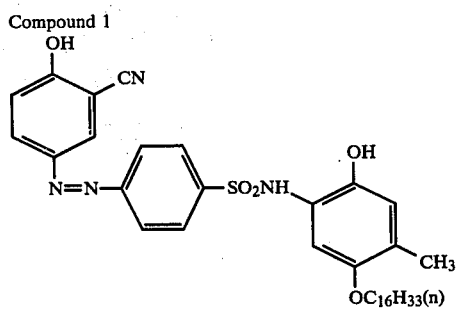

Compound 1

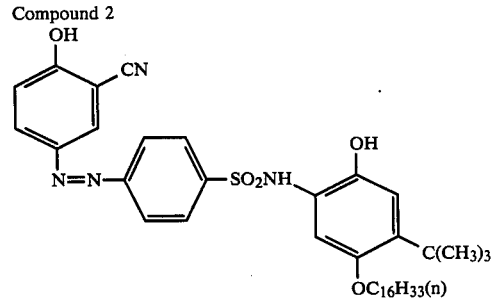

Compound 2

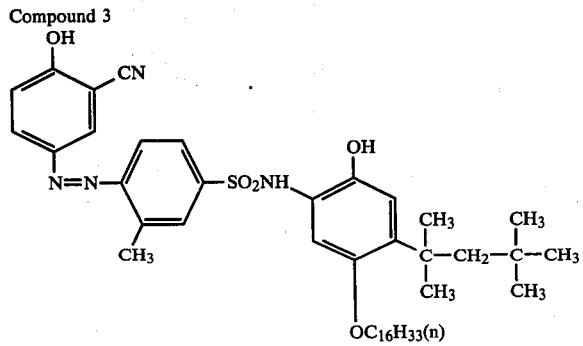

Compound 3

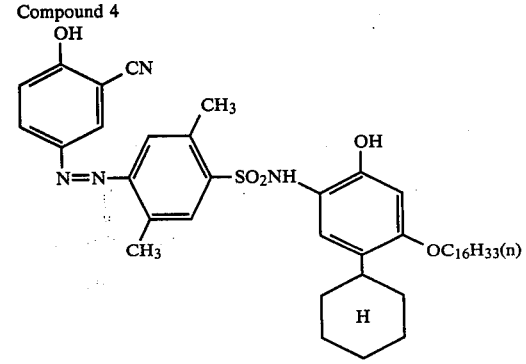

Compound 4

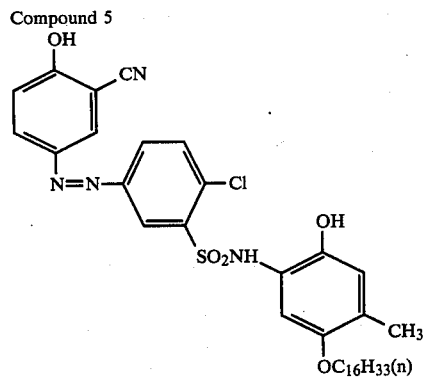

Compound 5

-continued
Compound 6
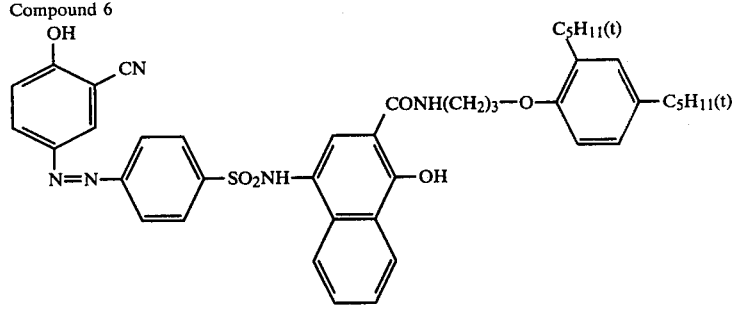
Compound 7
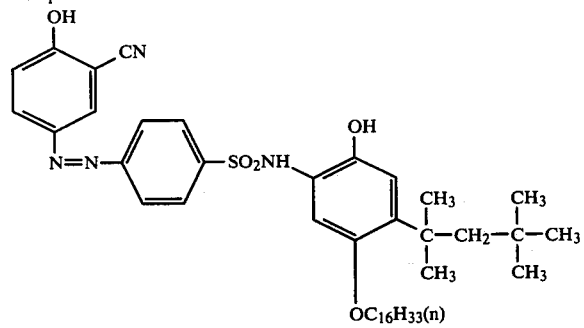
Compound 8
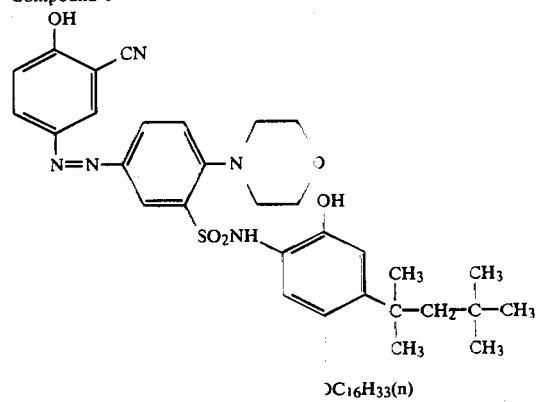
Compound 9
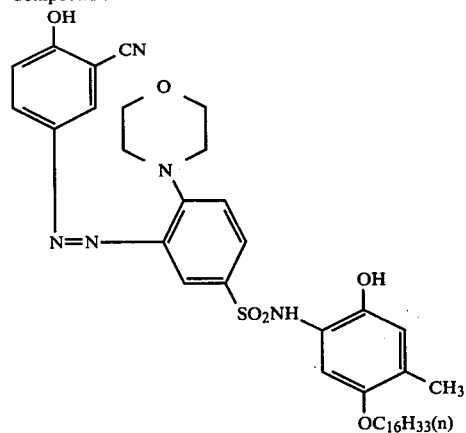
Compound 10
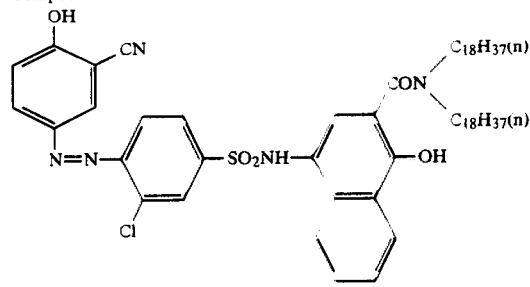
Compound 11
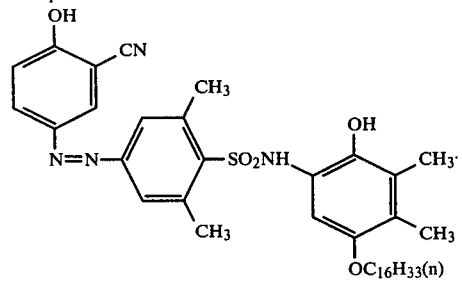
Compound 12
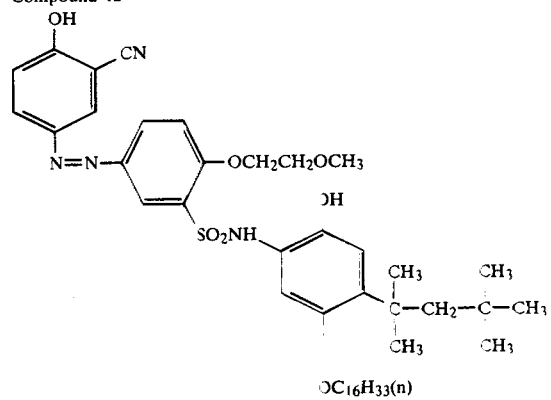
Compound 13
Compound 14

-continued
Compound 15
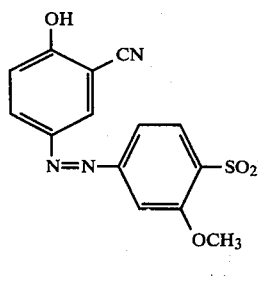
Compound 16
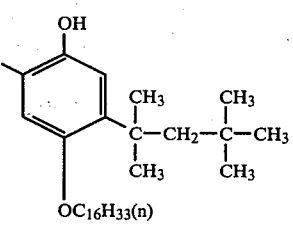
Compound 17
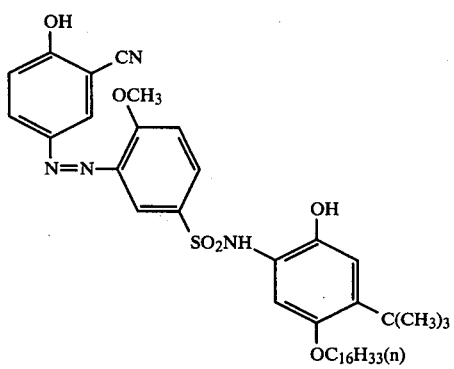
Compound 18
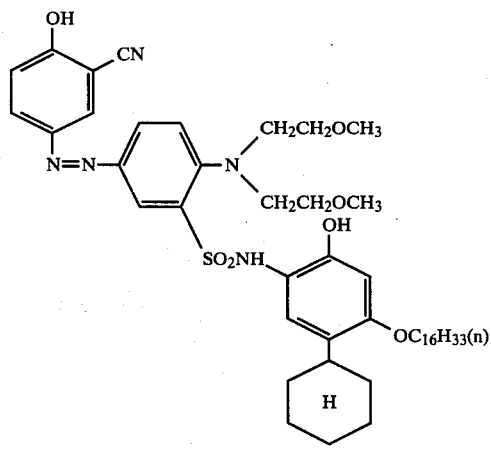
Compound 19
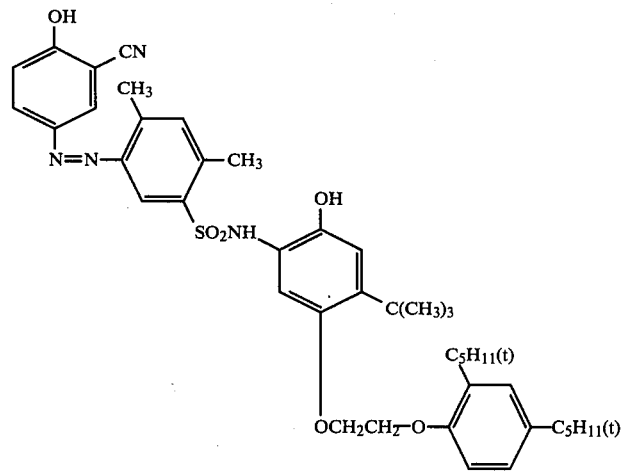
Compound 20
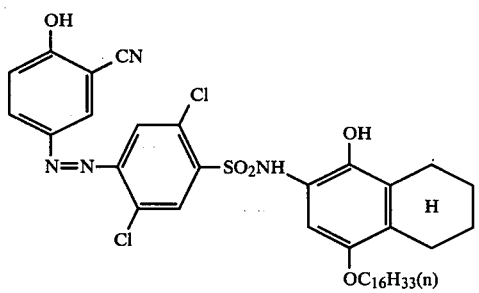

-continued
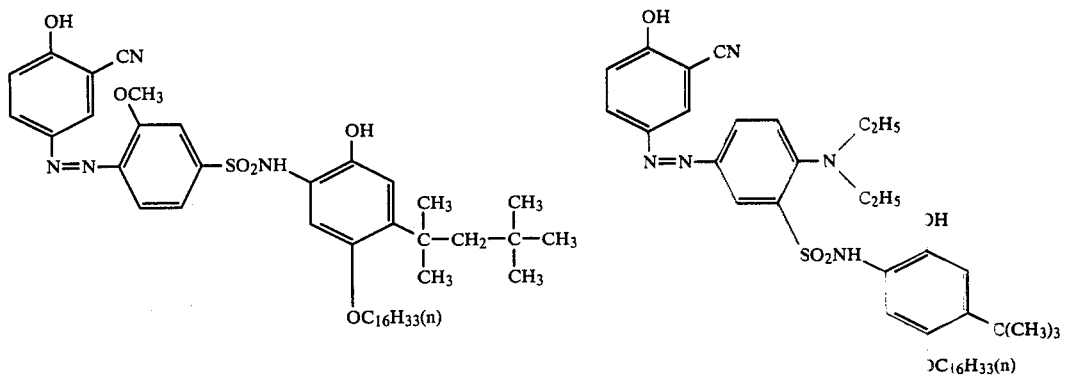
Compound 21
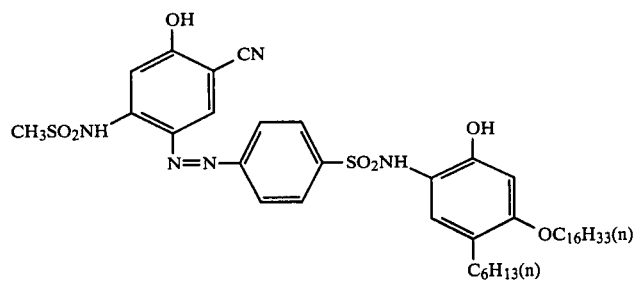
Compound 22
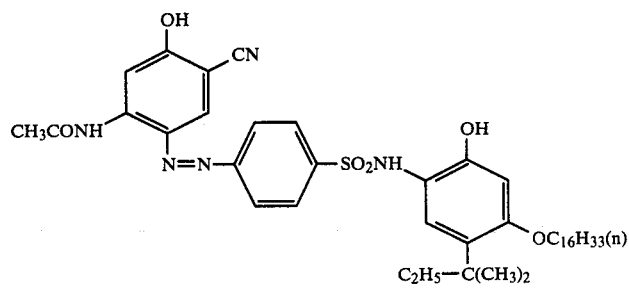
Compound 23
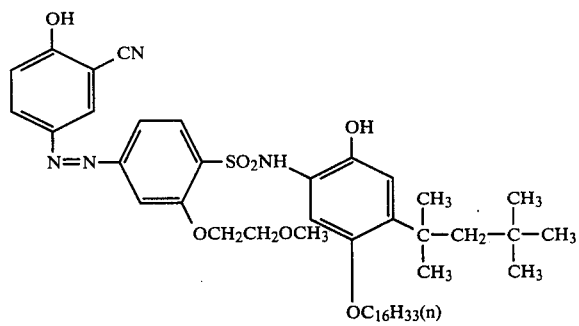
Compound 24
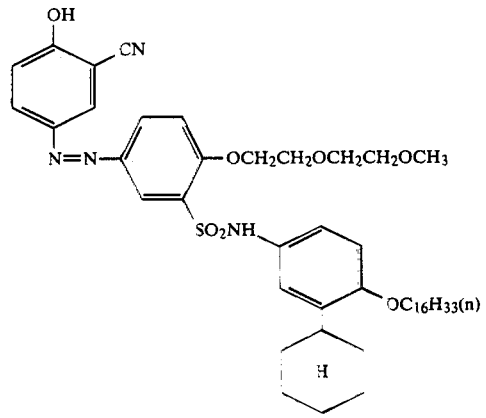
Compound 25

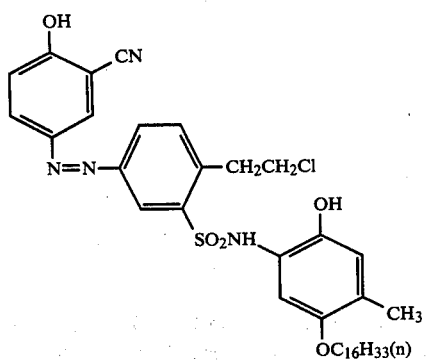
Compound 26
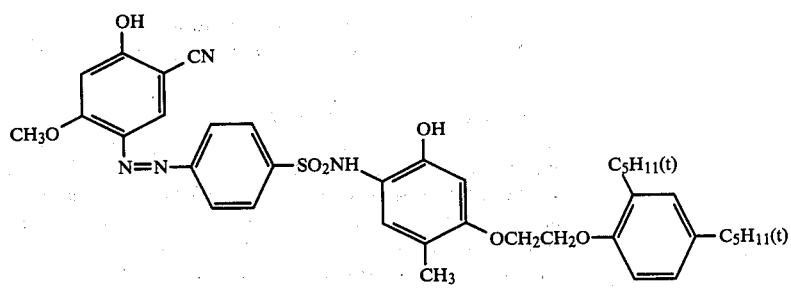
Compound 27
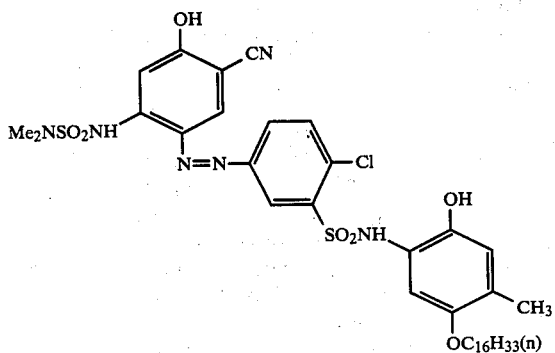
Compound 28
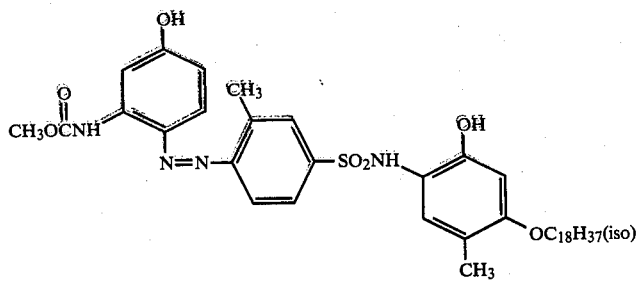
Compound 29

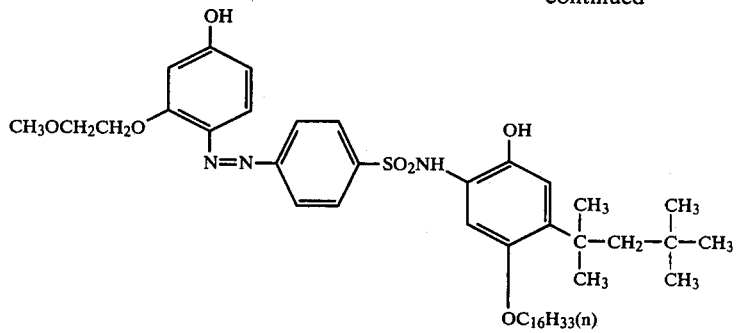

The compound according to the present invention releases a yellow dye compound represented by the following general formula (A):

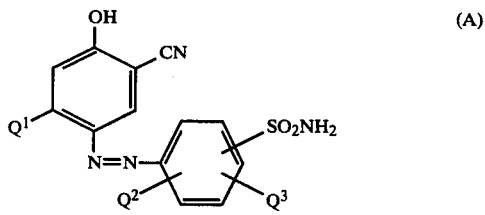
(A)

wherein $Q^1$, $Q^2$ and $Q^3$ each has the same meaning as defined in the general formula (I), when the compound is oxidized.

The compound according to the present invention can be obtained by a condensation reaction of a sulfonyl halide represented by the formula (B) with an aniline derivative represented by the formula (C); or by a coupling reaction of a compound represented by the formula (D) (the coupler or coupling component) with a diazo compound derived from an aniline derivative represented by the formula (E):

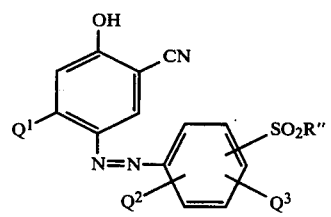
(B)

Y—NH$_2$ (C)

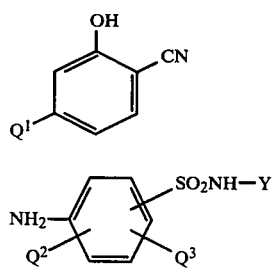
(D)

(E)

wherein $Q^1$, $Q^2$, $Q^3$ and Y each has the same meaning as defined in the general formula (I); and R" respresents a halogen atom (for example, a chlorine atom, a fluorine atom, etc.).

Typical synthesis examples of the dye releasing redox compounds used in the present invention and intermediate thereof are illustrated in detail below.

SYNTHESIS EXAMPLE 1

Synthesis of Compound 3

(a) Synthesis of Sodium 3-Methyl-4-(3'-cyano-4'-hydroxyphenylazo)benzenesulfonate An aqueous solution (80 ml) containing 12.7 g (0.06 mol) of sodium 3-methylsulfanilate and 17 ml of hydrochloric acid was cooled at 0° to 5° C. with stirring and to the solution was added dropwise 20 ml of an aqueous solution containing 4.5 g (0.065 mol) of sodium nitrite while maintaining the temperature of the reaction mixture at 0° to 5° C. After the completion of the addition, the mixture was further stirred for 1 hour.

The reaction solution of diazonium salt thus-prepared was added to an aqueous solution (100 ml) containing 6 g (0.05 mol) of 2-cyanophenol and 41 g (0.5 mol) of sodium acetate at 10° to 15° C. and stirred for 3 hours. The reaction solution was cooled to 5° C. and the crystals thus-precipitated were collected by filtration, washed with cold water and dried. Yield: 12.8 g (76%).

(b) Synthesis of 3-Methyl-4-(3'-cyano-4'-hydroxyphenylazo)benzenesulfonyl Chloride 12.5 g (0.037 mol) of the sodium benzenesulfonate obtained in Step (a) above was stirred in 74 ml of acetonitrile, to which were added dropwise 14 ml of phosphorus oxychloride and then 14 mol of N,N-dimethylacetamide, and the mixture was heated at 50° C. with stirring for 1.5 hours. After cooling, the reaction mixture was added to 300 ml of ice water and the crystals thus-precipitated were collected by filtration. Yield: 11.9 g (96%).

(c) Synthesis of Compound 3

To a solution of N,N-dimethylacetamide (80 ml) containing 17.5 g (0.0276 mol) of sodium 2-amino-4-hexadecyloxy-5-(1,1,3,3-tetramethylbutyl)phenol paratoluene sulfonate and 10 ml of pyridine was added 10 g (0.0298 mol) of the sulfonyl chloride obtained in Step (b) above with stirring while introducing a nitrogen gas and the mixture was stirred at room temperature for 1 hour and then at 50° C. for 30 minutes. The reaction solution was added to 400 ml of an aqueous solution containing 10 ml of hydrochloric acid and the precipitate was extracted with ethyl acetate. The ethyl acetate was dried with sodium sulfate and concentrated. The residue was purified using silica gel column chromatography (eluent: chloroform/ethyl acetate=3/1) and crystallized with a solvent mixture of methanol and water (4:1) to obtain Compound 3. Yield: 13.2 g (63%). Melting Point: 165° to 171° C.

SYNTHESIS EXAMPLE 2

Synthesis of Compound 7

The same diazo coupling reaction as described in Step (a) of Synthesis Example 1 above was repeated except using sulfanilic acid in place of the 3-methylsulfanilic acid to obtain sodium 4-(3'-cyano-4'-hydroxyphenylazo)benzenesulfonate. The latter compound was converted to a sulfonyl chloride in the same manner as described in Step (b) of Synthesis Example 1 above and then subjected to a condensation reaction with 2-amino-4-hexadecyloxy-5-(1,1,3,3-tetramethylbutyl)phenol paratoluene sulfonate in the same manner as described in Step (c) of Synthesis Example 1 above, followed by purification using silica gel column chromatography (eluent: chloroform/ethyl acetate=3/1) and crystallization with a solvent mixture of methanol and water (4:1) to obtain Compound 7. Melting Point: 67° to 71° C.

SYNTHESIS EXAMPLE 3

Synthesis of Compound 14

The same diazo coupling reaction as described in Step (a) of Synthesis Example 1 above was repeated except using 4-methoxymethanilic acid in place of the 3-methylsulfanilic acid to obtain sodium 3-(3'-cyano-4'-hydroxyphenylazo)-4-methoxybenzenesulfonate. The latter compound was converted to a sulfonyl chloride in the same manner as described in Step (b) of Synthesis Example 1 above and then subjected to a condensation reaction in the same manner as described in Step (c) of Synthesis Example 1 except using 2-amino-4-hexadecyloxy-5-tert-butylphenol hydrochloride in place of the 2-amino-4-hexadecyloxy-5-(1,1,3,3-tetramethylbutyl)phenol paratoluene sulfonate, followed by purification using silica gel column chromatography (eluent: n-hexane/ethyl acetate=1/1) and crystallization with a solvent mixture of methanol and water (4:1) to obtain Compound 14. Melting Point: 121° to 126° C.

SYNTHESIS EXAMPLE 4

Synthesis of Compound 8

(a) Synthesis of Sodium 2-Morpholino-5-nitrobenzenesulfonate

To 80 ml of morpholine, 82.5 g (0.3 mol) of sodium 2-chloro-5-nitrobenzenesulfonate was added with stirring. The reaction mixture was heated at about 110° C. on an oil bath with stirring for 30 minutes. After cooling, 100 ml of a saturated aqueous sodium chloride solution was added to the mixture. The crystals thus-precipitated were collected by filtration and washed with acetone to obtain 88 g (yield: 90%) of sodium 2-morpholino-5-nitrobenzenesulfonate.

(b) Synthesis of 2-Morpholino-5-nitrobenzenesulfonyl Chloride 31 g (0.1 mol) of sodium 2-morpholino-5-nitrobenzenesulfonate obtained in Step (a) above and 60 ml (0.67 mol) of phosphorus oxychloride were added to 300 ml of acetonitrile and the mixture was refluxed by heating for 2 hours. After cooling, the reaction mixture was added to 600 ml of ice water. The crystals thus-precipitated were collected by filtration. Yield: 18.5 g (60%).

(c) Synthesis of 2-(2'-Morpholino-5'-nitrobenzenesulfonamido)-4-hexadecyloxy-5-(1,1,3,3-tetramethylbutyl)phenol To a solution of N,N-dimethylacetamide (200 ml) containing 20 g (0.0314 mol) of 2-amino-4-hexadecyloxy-5-(1,1,3,3-tetramethylbutyl)phenol paratoluene sulfonate and 12.7 ml of pyridine was added 10.6 g (0.0346 mol) of the compound obtained in Step (b) above with stirring while introducing a nitrogen gas and the mixture was stirred at room temperature for 1 hour. The reaction solution was added to 500 ml of aqueous solution containing 15 ml of hydrochloric acid and the precipitate was extracted with ethyl acetate. The ethyl acetate was washed with water and concentrated. To the residue was added 100 ml of methanol and the crystals thus precipitated were collected by filtration. Yield: 22 g (94%).

(d) Synthesis of 2-(2'-Morpholino-5'-nitrobenzene-sulfonamido)-4-hexadecyloxy-5-(1,1,3,3-tetramethyl-butyl)phenyl Acetate A solution of acetic acid (70 ml) containing 21 g (0.0287 mol) of the compound obtained in Step (c) above, 15 ml of acetic anhydride and 9.8 g of sodium acetate was stirred at 80° C. for 2 hours. After cooling, the reaction mixture was added to 500 ml of water and the precipitate was extracted with ethyl acetate. The ethyl acetate was concentrated and to the residue was added 100 ml of methanol and the crystals thus-precipitated were collected by filtration. Yield: 20.6 g (93%).

(e) Synthesis of 2-(2'-Morpholino-5'-aminobenzene-sulfonamido)-4-hexadecyloxy-5-(1,1,3,3-tetramethyl-butyl)phenyl Acetate 26 g of reduced iron, 0.5 g of ammonium chloride, 7.2 ml of water and 7.2 ml of acetic acid were added to 100 ml of isopropyl alcohol and the mixture was refluxed with stirring. To the mixture was gradually added 17.5 g (0.0226 mol) of the compound obtained in Step (d) above and further refluxed with stirring for 20 minutes. After the reaction, the reaction solution was filtered with celite while hot. The filtrate was cooled and the crystals thus-precipitated were collected by filtration. Yield: 13.3 g (78%).

(f) Synthesis of Compound 8

11.2 g (0.015 mol) of the compound obtained in Step (e) above was added to a solvent mixture of 100 ml of methyl Cellosolve, 4.1 ml of hydrochloric acid and 4.1 ml of acetic acid and the mixture was stirred at about 0° C. To the reaction solution was added dropwise 10 ml of aqueous solution containing 1.1 g of sodium nitrite while maintaining the temperature of the reaction mixture at 0° to 5° C. followed further by stirring for 1 hour.

The reaction solution of diazonium salt thus-prepared was added to a methyl Cellosolve solution (25 ml) containing 1.6 g (0.013 mol) of 2-cyanophenol and 6.1 g of sodium acetate at 10° to 15° C. over a period of 2 hours and stirred for 3 hours. Then, a nitrogen gas was introduced into the reaction solution, to which was added a methanol solution (15 ml) containing 2.3 g of potassium hydroxide introduced also a nitrogen gas and the mixture was stirred at room temperature for 30 minutes.

The reaction mixture was added to an aqueous hydrochloric acid solution and the precipitate was extracted with ethyl acetate. The ethyl acetate was concentrated and the residue was purified using silica gel column chromatography (eluent: n-hexane/ethyl acetate=1/1) and crystallized with a solvent mixture of methanol and water (4:1) to obtain Compound 8. Yield: 5.5 g (46%). Melting Point: 143° to 148° C.

SYNTHESIS EXAMPLE 5

Synthesis of Compound 5

In the same manner as described in Synthesis Example 4, Step (a) was omitted and sodium 2-chloro-5-nitrobenzenesulfonate was converted to a sulfonyl chloride according to Step (b). The sulfonyl chloride was subjected to a condensation reaction in the same manner as described in Step (c) of Synthesis Example 4 except using 2-amino-4-hexadecyloxy-5-methylphenol hydrochloride in place of 2-amino-4-hexadecyloxy-5-(1,1,3,3-tetramethylbutyl)phenol paratoluenesulfonate followed by the acetylation, the reduction, the diazo coupling, the alkaline hydrolysis and the purification in the same manner as described in Steps (d), (e) and (f) to obtain Compound 5. Melting Point: 132° to 138° C.

The dye releasing redox compound which releases a diffusible dye according to the present invention can be used in an amount of a fixed range. Generally, a suitable range is about 0.01 mol to about 4 mols of the dye releasing redox compound per mol of the silver. A particularly suitable amount in the present invention is in a range of about 0.03 to about 1 mol per mol of the silver.

In the present invention, if necessary, a reducing agent may be used. The reducing agent in this case is the so-called auxiliary developing agent, which is oxidized by the silver halide to form its oxidized product having an ability to oxidize the reducing group Y in the dye releasing redox compound.

Examples of useful auxiliary developing agents include hydroquinone, alkyl-substituted hydroquinones such as tertiary butyl hydroquinone or 2,5-dimethylhydroquinone, catechols, pyrogallols, halogen-substituted hydroquinones such as chlorohydroquinone or dichloro-hydroquinone, alkoxy-substituted hydroquinones such as methoxyhydroquinone, polyhydroxybenzene derivatives such as methyl hydroxynaphthalene, etc. Further, there are methyl gallate, ascorbic acid, ascorbic acid derivatives, hydroxylamines such as N,N-di(2-ethoxyethyl)hydroxylamine, etc., pyrazolidones such as 1-phenyl-3-pyrazolidone or 4-methyl-4-hydroxymethyl-1-phenyl-3-pyrazolidone, etc., reductones and hydroxy tetronic acids.

The auxiliary developing agent can be used in an amount of a fixed range. A suitable range is 0.01 time by mol to 20 times by mol based on the silver halide. A particularly suitable range is 0.1 time by mol to 4 times by mol.

Examples of the silver halide used in the present invention include silver chloride, silver chloro-bromide, silver chloroiodide, silver bromide, silver iodobromide, silver chloroiodobromide and silver iodide, etc.

Particularly preferred examples of silver halide used in the present invention partially contain a silver iodide crystal in its particle. That is, the silver halide whose X-ray diffraction pattern shows that of pure silver iodide are particularly preferred.

The photographic materials comprise a silver halide containing at least two silver halides each having different halogen. Such silver halides yield a completely mixed crystal in a conventional silver halide emulsion. For example, the particle of silver iodobromide shows X-ray diffraction pattern at a position corresponding to the mixed ratio of silver iodide crystal and silver bromide crystal but not at a position corresponding to pure silver iodide crystal and pure silver bromide crystal separately.

Particularly preferred examples of silver halide used in the present invention include silver chloroiodide, silver iodobromide, and silver chloroiodo-bromide each containing silver iodide crystal in its particle.

The process for preparing those silver halides is explained taking the case of silver iodobromide. That is, the silver iodobromide is prepared by adding silver nitrate solution to potassium bromide solution to form silver bromide and further adding potassium iodide to the mixing solution.

The silver halide has a particle size of from 0.001 μm to 2 μm and preferably from 0.001 μm to 1 μm.

The silver halide used in the present invention may be used as is. However, it may be chemically sensitized with a chemical sensitizing agent such as compounds of sulfur, selenium or tellurium, etc., or compounds of gold, platinum, palladium, rhodium or iridium, etc., a reducing agent such as tin halide, etc., or a combination thereof. The details thereof are described in T. H. James, *The Theory of the Photographic Process*, the Fourth Edition, Chapter 5, pages 149 to 169.

Both the silver halide and the dye releasing redox compound may be incorporated into single layer, as well as the silver halide may be incorporated into one layer and the dye releasing redox compound may be incorporated into another layer coated under that layer.

A suitable coating amount of the light-sensitive silver halide used in the present invention is in a total of from 50 mg to 10 g/m$^2$ calculated as an amount of silver.

When an organic silver salt oxidizing agent is used together in the practice of the present invention, the sensitivity can be increased and the heat-development time can be shortened.

The organic silver salt oxidizing agent which can be used in the present invention is a silver salt which is comparatively stable to light and which forms a silver image by reacting with the above-described image forming compound or a reducing agent coexisting, if necessary, with the image forming compound, when it is heated to a temperature of above 80° C. and, preferably, above 100° C. in the presence of exposed silver halide.

Examples of these organic silver salt oxidizing agents include the following compounds.

A silver salt of an organic compound having a carboxy group. Typical examples thereof include a silver salt of an aliphatic carboxylic acid and a silver salt of an aromatic carboxylic acid.

Examples of the silver salts of aliphatic carboxylic acids include silver behenate, silver stearate, silver oleate, silver laurate, silver caprate, silver myristate, silver palmitate, silver maleate, silver fumarate, silver tartarate, silver furoate, silver linolate, silver oleate, silver adipate, silver sebacate, silver succinate, silver acetate, silver butyrate and silver camphorate, etc. These silver salts which are substituted with a halogen atom or a hydroxyl group are also effectively used.

Examples of the silver salts of aromatic carboxylic acid and other carboxyl group containing compounds include silver benzoate, a silver-substituted benzoate such as silver 3,5-dihydroxybenzoate, silver o-methylbenzoate, silver m-methylbenzoate, silver p-methylbenzoate, silver 2,4-dichlorobenzoate, silver acetamidobenzoate, silver p-phenylbenzoate, etc., silver gallate, silver tannate, silver phthalate, silver terephthalate, silver salicylate, silver phenylacetate, silver pyromellitate, a silver salt of 3-carboxymethyl-4-methyl-4-thiazoline-2-thione or the like as described in U.S. Pat. No. 3,785,830, and a silver salt of an aliphatic carboxylic acid containing a thioether group as described in U.S. Pat. No. 3,330,663, etc.

In addition, a silver salt of a compound containing a mercapto group or a thione group and a derivative thereof can be used.

Examples of these compounds include a silver salt of 3-mercapto-4-phenyl-1,2,4-triazole, a silver salt of 2-mercaptobenzimidazole, a silver salt of 2-mercapto-5-aminothiadiazole, a silver salt of 2-mercaptobenzothiazole, a silver salt of 2-(S-ethylglycolamido)-benzothiazole, a silver salt of thioglycolic acid such as a silver salt of an S-alkyl thioglycolic acid (wherein the alkyl group has from 12 to 22 carbon atoms) as described in Japanese patent application (OPI) No. 28221/73, etc., a silver salt of dithiocarboxylic acid such as a silver salt of dithioacetic acid, etc., a silver salt of thioamide, a silver salt of 5-carboxyl-1-methyl-2-phenyl-4-thiopyridine, a silver salt of mercaptotriazine, a silver salt of 2-mercaptobenzoxazole, a silver salt of mercaptooxadiazole, a silver salt as described in U.S. Pat. No. 4,123,274, for example, a silver salt of 1,2,4-mercaptotriazole derivative such as a silver salt of 3-amino-5-benzylthio-1,2,4-triazole, a silver salt of thione compound such as a silver salt of 3-(2-carboxyethyl)-4-methyl-4-thiazoline-2-thione as described in U.S. Pat. No. 3,301,678, etc., and the like.

Further, a silver salt of a compound containing an imino group can be used. Examples of these compounds include a silver salt of benzotriazole and a derivative thereof as described in Japanese patent publication Nos. 30270/69 and 18416/70, for example, a silver salt of benzotriazole, a silver salt of alkyl-substituted benzotriazole such as a silver salt of methylbenzotriazole, etc., a silver salt of a halogen-substituted benzotriazole such as a silver salt of 5-chloro-benzotriazole, etc., a silver salt of carboimido-benzotriazole such as a silver salt of butylcarboimido-benzotriazole, etc., a silver salt of 1,2,4-triazole or 1-H-tetrazole as described in U.S. Pat. No. 4,220,709, a silver salt of carbazole, a silver salt of saccharin, a silver salt of imidazole and an imidazole derivative, and the like.

Moreover, a silver salt as described in *Research Disclosure*, Vol. 170, No. 17029 (June, 1978) and an organic metal salt such as copper stearate, etc., are examples of the organic metal salt oxidizing agent capable of being used in the present invention.

The mechanism of the heat-development process under heating in the present invention is not entirely clear, but it is believed to be as follows.

When the photographic material is exposed to light, a latent image is formed in a light-sensitive silver halide. This phenomenon is described in T. H. James, *The Theory of the Photographic Process*, Third Edition, pages 105 to 148.

When the photographic material is heated, the reducing agent, the dye releasing redox compound, in the case of the present invention reduces the silver halide or the silver halide and the organic silver salt oxidizing agent in the presence of the latent image nuclei as a catalyst with the assistance of an alkali agent released by heating to form metallic silver, while it is oxidized itself. The oxidized product of the dye releasing redox compound is attacked by a nucleophilic agent (a dye releasing activator in the case of the present invention) to release a dye.

When the organic silver salt oxidizing agent is used, the silver halide and the organic silver salt oxidizing agent which form a starting point of development should be present within a substantially effective distance.

For this purpose, it is desired that the silver halide and the organic silver salt oxidizing agent are present in the same layer.

The silver halide and the organic metal salt oxidizing agent which are separately formed can be mixed prior to use to prepare a coating solution, but it is also effective to blend both of them in a ball mill for a long period of time. Further, it is effective to use a process which comprises adding a halogen containing compound to the organic silver salt oxidizing agent prepared to form silver halide using silver of the organic silver salt oxidizing agent.

Methods of preparing these silver halide and organic silver salt oxidizing agents and manners of blending them are described in *Research Disclosure*, No. 17029, Japanese patent application (OPI) Nos. 32928/75 and 42529/76, U.S. Pat. No. 3,700,458, and Japanese patent application (OPI) Nos. 13224/74 and 17216/75.

The organic silver salt oxidizing agent used, if necessary, in the present invention is suitably contained in an amount in the range of from 0.1 mol to 200 mols per mol of the silver halide.

A suitable coating amount of the light-sensitive silver halide and the organic silver salt oxidizing agent employed in the present invention is in a total of from 50 mg to 10 g/m$^2$ calculated as an amount of silver.

The light-sensitive silver halide and the organic silver salt oxidizing agent used in the present invention are prepared in the binder as described below. Further, the dye releasing redox compound is dispersed in the binder described below.

The binder which can be used in the present invention can be employed individually or in a combination of two or more. A hydrophilic binder can be used as the binder according to the present invention. The typical hydrophilic binder is a transparent or translucent hydrophilic colloid, examples of which include a natural substance, for example, protein such as gelatin, a gelatin derivative, a cellulose derivative, etc., a polysaccharide such as starch, gum arabic, etc., and a synthetic polymer, for example, a water-soluble polyvinyl compound such as polyvinyl pyrrolidone, acrylamide polymer, etc. Another example of the synthetic polymer compound is a dispersed vinyl compound in a latex form which is used for the purpose of increasing dimensional stability of a photographic material.

In the heat-developable color photographic material of the present invention, various kinds of dye releasing activators may be used in order to accelerate the dye releasing reaction. The dye releasing activator means a substance which attacks nucleophilically the dye releasing redox compound oxidized by the silver halide or the organic silver salt oxidizing agent to release a diffusible dye, and bases, base releasing agents and water releasing compounds are used. In these dye releasing activators, the bases and the base releasing agents are particularly preferred because they not only accelerate release of the dye but also accelerate the oxidation-reduction reaction between the silver halide or the organic silver salt oxidizing agent and the dye releasing redox compound.

Examples of preferred bases are amines which include trialkylamines, hydroxylamines, aliphatic polyamines, N-alkyl-substituted aromatic amines, N-hydroxyalkyl-substituted aromatic amines and bis[p-(dialkylamino)phenyl]methanes. Further, there are betaine tetramethylammonium iodide and diaminobutane dihydrochloride as described in U.S. Pat. No. 2,410,644, and urea and organic compounds including amino acids such as 6-aminocaproic acid as described in U.S. Pat. No. 3,506,444. The base releasing agent is a substance which releases a basic component by heating. Examples of typical base releasing agent have been described in British Pat. No. 998,949. A preferred base releasing agent is a salt of a carboxylic acid and an organic base, and examples of the suitable carboxylic acid include trichloroacetic acid and trifluoroacetic acid and examples of the suitable base include guanidine, piperidine, morpholine, p-toluidine and 2-picoline, etc. Guanidine trichloroacetate as described in U.S. Pat. No. 3,220,846 is particularly preferred. Further, aldonic amides as described in Japanese patent application (OPI) No. 22625/75 are suitably used because they decompose at a high temperature to form a base.

The water releasing compound means a compound which releases water by decomposition during heat-development to convert into a compound having a vapor pressure of $10^{-5}$ Torrs or more at a temperature of 100° to 200° C. These compounds are known in the field of printing of fabrics, and $NH_4Fe(SO_4)_2 \cdot 12H_2O$, etc., as described in Japanese patent application (OPI) No. 88386/75 are useful.

These dye releasing activators can be used in the amount of a broad range. They are preferably used in an amount in the range of 1/100 to 10 times and, more preferably, 1/20 to 2 times by molar ratio based on silver.

Further, in the heat-developable color photographic material of the present invention, it is possible to use compounds which activate development and simultaneously stabilize the images. Particularly, it is suitable to use isothiuroniums including 2-hydroxy-ethylisothiuornium trichloroacetate as described in U.S. Pat. No. 3,301,678, bisisothiuroniums including 1,8-(3,6-dioxaoctane)-bis(isothiuronium trifluoroacetate), etc., as described in U.S. Pat. No. 3,669,670, thiol compounds as described in German patent application (OLS) No. 2,162,714, thiazolium compounds such as 2-amino-2-thiazolium trichloroacetate, 2-amino-5-bromoethyl-2-thiazolium trichloroacetate, etc., as described in U.S. Pat. No. 4,012,260, compounds having α-sulfonylacetate as an acid part such as bis(2-amino-2-thiazolium)-methylene-bis(sulfonylacetate), 2-amino-2-thiazolium phenyl-sulfonylacetate, etc., as described in U.S. Pat. No. 4,060,420, and compounds having 2-carboxycarboxamide as an acid part as described in U.S. Pat. No. 4,088,496.

These compounds or mixtures thereof can be used in a wide range of amounts. They are preferably used in a range of 1/100 to 10 times and, more preferably, 1/20 to 2 times by molar ratio based on silver.

In the heat-developable color photographic material of the present invention, it is possible to use a thermal solvent. The term "thermal solvent" means a non-hydrolyzable organic material which is solid at an ambient temperature but melts together with other components at a temperature of heat treatment or below. Preferred examples of thermal solvents include compounds which can act as a solvent for the developing agent and compounds having a high dielectric constant which accelerate physical development of silver salts. Examples of preferred thermal solvents include polyglycols as described in U.S. Pat. No. 3,347,675, for example, polyethylene glycol having an average molecular weight of 1,500 to 20,000, derivatives of polyethylene oxide such as oleic acid ester, etc., beeswax, monostearin, compounds having a high dielectric constant which have —$SO_2$— or —CO— such as acetamide, succinimide, ethylcarbamate, urea, methylsulfonamide, ethylene carbonate, etc., polar substances as described in U.S. Pat. No. 3,667,959, lactone of 4-hydroxybutanoic acid, methylsulfinylmethane, tetrahydrothiophene-1,1-dioxide, and 1,10-decanediol, methyl anisate and biphenyl suberate as described in *Research Disclosure*, pages 26 to 28 (Dec., 1976), etc.

In the present invention, though it is not necessary to incorporate substances or dyes for preventing irradiation or halation in the photographic material, because the photographic material is colored by the dye releasing redox compound, it is possible to add filter dyes or light absorbent materials, etc., as described in Japanese patent publication No. 3692/73, U.S. Pat. Nos. 3,253,921, 2,527,583 and 2,956,879, etc., in order to further improve sharpness. It is preferred that these dyes have a thermal bleaching property. For example, dyes as described in U.S. Pat. Nos. 3,769,019, 3,745,009 and 3,615,432 are preferred.

The photographic material according to the present invention may contain, if necessary, various additives known for the heat-developable photographic materials and may have a layer other than the light-sensitive layer, for example, an antistatic layer, an electrically conductive layer, a protective layer, an intermediate layer, an antihalation layer and a strippable layer, etc. Examples of additives include those described in *Research Disclosure*, Vol. 170, No. 17029 (June, 1978), for example, plasticizers, dyes for improving sharpness, antihalation dyes, sensitizing dyes, matting agents, surface active agents, fluorescent whitening agents and fading preventing agents, etc.

The protective layer, the intermediate layer, the subbing layer, the back layer and other layers can be produced by preparing each coating solution and applying to a support by various coating methods such as a dip coating method, an air-knife coating method, a curtain coating method or a hopper coating method as described in U.S. Pat. No. 2,681,294, and drying in a similar manner to preparing the heat-developable photographic layer of the present invention, by which the photographic material is obtained.

If desired, two or more layers may be applied at the same time by the method as described in U.S. Pat. No. 2,761,791 and British Pat. No. 837,095.

Various means of exposure can be used in connection with the heat-developable photographic material of the present invention. Latent images are obtained by imagewise exposure by radiant rays including visible rays. Generally, light sources used for conventional color prints can be used, examples of which include tungsten lamps, mercury lamps, halogen lamps such as iodine lamps, xenon lamps, laser light sources, CRT light sources, fluorescent tubes and light-emitting diodes, etc.

The original may be line drawings or photographs having gradation. Further, it is possible to take a photograph of a portrait or landscape by means of a camera. Printing from the original may be carried out by contact printing by putting the original in close contact with the material or may be carried out by reflection printing or enlargement printing.

It is also possible to carry out the printing of images photographed by a videocamera or image informations sent from a television broadcasting station by displaying on a cathode ray tube (CRT) or a fiber optical tube (FOT) and focusing the resulting image on the heat-developable photographic material by contacting therewith or by means of a lens.

Recently, light-emitting diode (LED) systems which have been greatly improved have begun to be utilized as an exposure means or display means for various apparatus and devices. It is difficult to produce an LED which effectively emits blue light. In this case, in order to reproduce the color image, three kinds of LEDs consisting of those emitting each green light, red light and infrared light are used. The photographic material to be sensitized by these lights is produced so as to release a yellow dye, a magenta dye and a cyan dye, respectively.

The photographic material is produced using a construction such that the green-sensitive part (layer) contains a yellow dye releasing compound, the red-sensitive part (layer) contains a magenta dye releasing compound and the infrared-sensitive part (layer) contains a cyan dye releasing compound. Other combinations can be utilized, if desired.

In addition to the above-described methods of contacting or projecting the original, there is a method of exposure wherein the original illuminated by a light source is stored in a memory of a reading computer by means of a light-receiving element such as a phototube or a charge coupling device (CCD). The resulting information is, if desired, subjected to processing, the so-called image treatment, and resulting image information is reproduced on CRT which can be utilized as an image-like light source or lights are emitted by three kinds of LEDs according to the processed information.

After the heat-developable color photographic material is exposed to light, the resulting latent image can be developed by heating the whole material to a suitably elevated temperature, for example, about 80° C. to about 250° C. for about 0.5 second to about 300 seconds. A higher temperature or lower temperature can be utilized to prolong or shorten the heating time, if it is within the above-described temperature range. Particularly, a temperature range of about 110° C. to about 160° C. is useful. As the heating means, a simple heat plate, iron, heat roller or analogues thereof may be used.

In the present invention, a specific method for forming a color image by heat-development comprises heat diffusion transfer of a hydrophilic diffusible dye. For this purpose, the heat-developable color photographic material is composed of a support having thereon a light-sensitive layer (I) containing at least silver halide, an organic silver salt oxidizing agent, a dye releasing redox compound which is also a reducing agent for the organic silver salt oxidizing agent and a hydrophilic binder, and an image receiving layer (II) capable of receiving the hydrophilic diffusible dye formed in the light-sensitive layer (I).

A dye releasing activator may be incorporated either into the light-sensitive layer (I) or into the image receiving layer (II). Alternatively, means for supplying the dye releasing activator (for example, a rupturable pod containing the dye releasing activator, a roller in which the dye releasing activator is impregnated, an apparatus for spraying a solution containing the dye releasing activator, etc.) may be separately provided.

The above-described light-sensitive layer (I) and the image receiving layer (II) may be formed on the same support, or they may be formed on different supports, respectively. The image receiving layer (II) can be stripped off the light-sensitive layer (I). For example, after the heat-developable color photographic material is exposed imagewise to light, it is developed by heating uniformly and thereafter the image receiving layer (II) is peeled apart.

In accordance with another process, after the heat-developable color photographic material is exposed imagewise to light and developed by heating uniformly, the dye can be transferred on the image receiving layer (II) by superposing the image receiving layer on the light-sensitive layer (I) and heating to a temperature lower than the developing temperature. The temperature lower than the developing temperature in such a case includes room temperature and preferably a temperature from room temperature to a temperature by about 40° C. lower than the heat-developing temperature. For example, a heat-developing temperature and a transferring temperature are 120° C. and 80° C., respectively. Further, there is a method wherein only the light-sensitive layer (I) is exposed imagewise to light and then developed by heating uniformly by superposing the image receiving layer (II) on the light-sensitive layer (I).

The image receiving layer (II) can contain a dye mordant. In the present invention, various mordants can be used, and a useful mordant can be selected according to properties of the dye, conditions for transfer, and other components contained in the photographic material, etc. The mordants which can be used in the present invention include high molecular weight polymer mordants.

Polymer mordants to be used in the present invention are polymers containing secondary and tertiary amino groups, polymers containing nitrogen-containing hetero ring moieties, polymers having quaternary cation groups thereof, having a molecular weight of from 5,000 to 200,000, and particularly from 10,000 to 50,000.

For example, there are illustrated vinylpyridine polymers and vinylpyridinium cation polymers as disclosed in U.S. Pat. Nos. 2,548,564, 2,484,430, 3,148,061 and 3,756,814, etc., polymer mordants capable of cross-linking with gelatin, etc., as disclosed in U.S. Pat. Nos. 3,625,694, 3,859,096 and 4,128,538, British Pat. No. 1,277,453, etc., aqueous sol type mordants as disclosed in U.S. Pat. Nos. 3,958,995, 2,721,852 and 2,798,063, Japanese patent application (OPI) Nos. 115228/79, 145529/79 and 126027/79, etc., water-insoluble mordants as disclosed in U.S. Pat. No. 3,898,088, etc., reactive mordants capable of forming covalent bonds with dyes used as disclosed in U.S. Pat. No. 4,168,976 (Japanese patent application (OPI) No. 137333/79), etc., and mordants disclosed in U.S. Pat. Nos. 3,709,690, 3,788,855, 3,642,482, 3,488,706, 3,557,066, 3,271,147 and 3,271,148, Japanese patent application (OPI) Nos. 71332/75, 30328/78, 155528/77, 125/78 and 1024/78, etc.

In addition, mordants disclosed in U.S. Pat. Nos. 2,675,316 and 2,882,156 can be used.

Of these mordants, those which migrate with difficulty from a mordanting layer to other layers are preferable; for example, mordants capable of cross-linking with a matrix such as gelatin, water-insoluble mordants, and aqueous sol (or latex dispersion) type mordants are preferably used.

Particularly preferable polymer mordants are described below.

(1) Polymers having quaternary ammonium groups and groups capable of forming covalent bonds with gelatin (for example, aldehydo groups, chloroalkanoyl groups, chloroalkyl groups, vinylsulfonyl groups, pyridiniumpropionyl groups, vinylcarbonyl groups, alkylsulfonoxy groups, etc.), such as

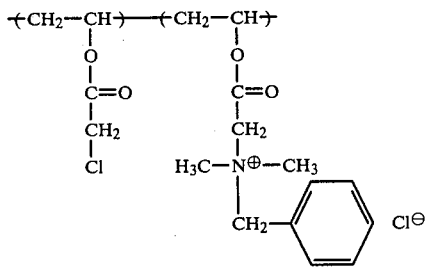

(2) Reaction products between a copolymer of a monomer represented by the following general formula with another ethylenically unsaturated monomer and a cross-linking agent (for example, bisalkanesulfonate, bisarenesulfonate, etc.):

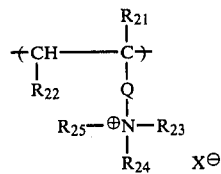

wherein $R_{21}$ represents H or an alkyl group, $R_{22}$ represents H, an alkyl group or an aryl group, Q represents a divalent group, $R_{23}$, $R_{24}$ and $R_{25}$ each represents an alkyl group, an aryl group or at least two of $R_{23}$ to $R_{25}$ are bonded together to form a hetero ring, and X represents an anion. The above-described alkyl groups and aryl groups may be substituted.

(3) Polymers represented by the following general formula:

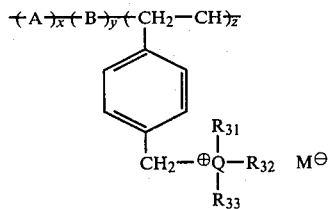

wherein x is from about 0.25 mol % to about 5 mol %, y is from about 0 mol % to about 90 mol %, z is from about 10 mol % to about 99 mol %, A represents a monomer having at least two ethylenically unsaturated bonds, B represents a copolymerizable ethylenically unsaturated monomer, Q represents N or P, $R_{31}$, $R_{32}$ and $R_{33}$ each represents an alkyl group or a cyclic hydrocarbon group or at least two of $R_{31}$ to $R_{33}$ are bonded together to form a ring (these groups and rings may be substituted), and M represents an anion.

(4) Copolymers composed of (a), (b) and (c), wherein:
(a) is

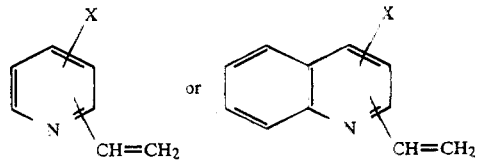

wherein X represents a hydrogen atom, an alkyl group or a halogen atom (the alkyl group may be substituted);
(b) is an acrylic ester; and
(c) is acrylonitrile.

(5) Water-insoluble polymers wherein at least ⅓ of the repeating units are those represented by the following general formula:

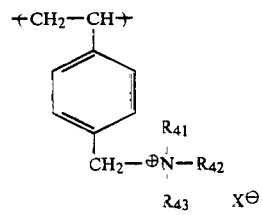

wherein $R_{41}$, $R_{42}$ and $R_{43}$ each represents an alkyl group, with the total number of carbon atoms being 12 or more (the alkyl group may be substituted), and X represents an anion.

Various kinds of known gelatins can be employed as gelatin for the mordant layer. For example, gelatin which is produced in a different manner such as lime-processed gelatin, acid-processed gelatin, etc., or a gelatin derivative which is prepared by chemically modifying gelatin such as phthalated gelatin, sulfolnated gelatin, etc., can be used. Also, gelatin subjected to a desalting treatment can be used, if desired.

The ratio of polymer mordant to gelatin and the amount of the polymer mordant coated can be easily determined by one skilled in the art depending on the amount of the dye to be mordanted, the type and composition of the polymer mordant and further on the image-forming process used. Preferably, the ratio of mordant to gelatin is from about 20/80 to 80/20 (by weight) and the amount of the mordant coated is from 0.5 to 8 g/m².

The image receiving layer (II) can have a white reflective layer. For example, a layer of titanium dioxide dispersed in gelatin can be provided on the mordant layer on a transparent support. The layer of titanium dioxide forms a white opaque layer, by which reflection color images of the transferred color images which are observed through the transparent support are obtained.

Typical image receiving materials for diffusion transfer are obtained by mixing the polymer containing ammonium salt groups with gelatin and applying the mixture to a transparent support.

The transfer of dyes from the photographic light-sensitive layer to the image receiving layer can be carried out using a transfer solvent. Examples of useful transfer solvents include water and an alkaline aqueous solution containing sodium hydroxide, potassium hydroxide and an inorganic alkali metal salt. Further, a solvent having a low boiling point such as methanol, N,N-dimethylformamide, acetone, diisobutyl ketone, etc., and a mixture of such a solvent having a low boiling point with water or an alkaline aqueous solution can be used. The transfer solvent can be employed by wetting the image receiving layer with the transfer solvent or by incorporating it in the form of water of crystallization or microcapsules into the photographic material.

The present invention will be explained in greater detail with reference to the following examples, but the present invention should not be construed as being limited thereto.

EXAMPLE 1

40 g of gelatin and 26 g of potassium bromide were dissolved in 3,000 ml of water and the solution was stirred while maintaining the temperature at 50° C. A solution containing 34 g of silver nitrate dissolved in 200 ml of water was added to the above-described solution over a period of 10 minutes. Then, a solution containing 3.3 g of potassium iodide dissolved in 100 ml of water was added for a period of 2 minutes. By controlling the pH of the silver iodobromide emulsion thus prepared precipitate was formed and the excess salts were removed. The pH of the emulsion was then adjusted to 6.0 and 400 g of the silver iodobromide emulsion was obtained.

In the following, a method of preparing a gelatin dispersion of a dye releasing redox compound is described.

posed imagewise at 2,000 lux for 10 seconds using a tungsten lamp and then uniformly heated on a heat block for 30 seconds which had been heated at 150° C.

In the following, a method of preparing an image receiving material having an image receiving layer is described.

10 g of a copolymer of methyl acrylate and N,N,N-trimethyl-N-vinylbenzyl ammonium chloride (a ratio of methyl acrylate and vinylbenzyl ammonium chloride being 1:1) was dissolved in 200 ml of water and the solution was uniformly mixed with 100 g of a 10% aqueous solution of lime-processed gelatin. The mixture was uniformly coated on a polyethylene terephthalate film at a wet thickness of 20 μm and dried to prepare an image receiving material.

The image receiving material was soaked in water and superposed on the heated photographic light-sensitive material described above in order to bring them into contact with each of the surface layers. After 30 seconds, the image receiving material was peeled apart from the photographic light-sensitive material to obtain a negative yellow color image on the image receiving material. The optical density of the negative image was measured using a Macbeth transmission densitometer (TD-504). The maximum density and the minimum density to blue light were 1.40 and 0.12, respectively.

Also, the same procedure and process as described above were repeated except using a comparative compound having a structure set forth below in place of Dye Releasing Redox Compound (3).

Comparative Compound

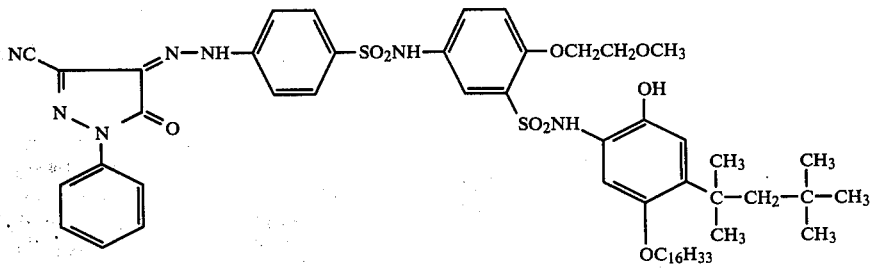

A mixture of 10 g of Dye Releasing Redox Compound (3), 0.5 g of sodium 2-ethylhexylsulfosuccinate, 20 g of tricresyl phosphate (TCP) and 20 ml of cyclohexanone was heated at about 60° C. to form a solution. The solution was mixed with 100 g of a 10% aqueous solution of gelatin and then dispersed using a homogenizer at 10,000 rpm for 10 minutes. The dispersion thus prepared is designated a dispersion of a dye releasing redox compound.

In the following, a method of preparing a light-sensitive coating is described.

| | |
|---|---|
| (a) a light-sensitive silver iodobromide emulsion | 5 g |
| (b) a dispersion of a dye releasing redox compound | 3.5 g |
| (c) a solution containing 250 mg of guanidine trichloroacetate dissolved in 2 ml of methanol | |

The above-described components (a), (b) and (c) and 2 ml of water were mixed and dissolved by heating. The solution was coated on a polyethylene terephthalate film having a thickness of 180 μm at a wet thickness of 60 μm and dried. The sample thus-prepared was exposed The maximum density and the minimum density to blue light thus-obtained were 0.90 and 0.20, respectively. From the results shown above it is apparent that the dye releasing redox compound according to the present invention can provide a high image density as well as a low fog density.

EXAMPLES 2 TO 6

The same procedure as described in Example 1 was repeated except using 10 g of Dye Releasing Redox Compounds (7), (5), (8), (12) and (14) in place of Dye Releasing Redox Compound (3) to prepare Photographic Materials Nos. 2 to 6, respectively.

These Photographic Materials Nos. 2 to 6 were subjected to the same process as described in Example 1 to obtain yellow color images on the image receiving materials. The results of the optical density measurement are shown in the following table.

| Photographic Material No. | Dye Releasing Redox Compound | Maximum Color Density | Minimum Color Density | λmax (nm) |
|---|---|---|---|---|
| 2 | (7) | 1.35 | 0.13 | 439 |
| 3 | (5) | 1.20 | 0.10 | 442 |
| 4 | (8) | 1.50 | 0.14 | 451 |
| 5 | (12) | 1.20 | 0.12 | 451 |
| 6 | (14) | 1.30 | 0.11 | 448 |

EXAMPLE 7

6.5 g of benzotriazole and 10 g of gelatin were dissolved in 1,000 ml of water and the solution was stirred while maintaining the temperature at 50° C. A solution containing 8.5 g of silver nitrate dissolved in 100 ml water was added to the above-described solution over a period of 2 minutes. Then, a solution containing 1.2 g of potassium bromide dissolved in 50 ml of water was added over a period of 2 minutes. By controlling the pH of the emulsion thus-prepared precipitate was formed and excess salts were removed. The pH of the emulsion was then adjusted to 6.0 and 200 g of the emulsion was obtained.

A light-sensitive coating was prepared in the same procedure as described in Example 1 except using the following components:

| | |
|---|---|
| (a) a silver benzotriazole emulsion containing a light-sensitive silver bromide | 10 g |
| (b) a dispersion of a dye releasing redox compound as described in Example 1 | 3.5 g |
| (c) a solution containing 0.25 g of guanidine trichloroacetate dissolved in 2 ml of methanol | |

Then, the same procedure and process as described in Example 1 were carried out. As a result, a negative yellow color image having the maximum density of 1.55 and the minimum density of 0.12 was obtained on an image receiving material.

EXAMPLE 8

The same procedure and process as described in Example 1 were repeated except adding 0.4 g of 1-phenyl-4-methyl-4-oxymethyl-3-pyrazolidinone as an auxiliary developing agent to the light-sensitive coating of Example 1. As a result, a yellow color image having the maximum density of 1.45 and the minimum density of 0.11 was obtained.

These results are almost the same as those obtained in Example 1 and this indicates that it is possible to form a sufficient image without using the auxiliary developing agent according to the present invention.

EXAMPLE 9

In the dye transfer process as described in Example 1, an image receiving material was soaked in a 0.1 N aqueous sodium hydroxide solution in place of the soaking in water. As a result, a yellow color image having the maximum color density of 1.80 and the minimum color density of 0.30 was obtained.

While the invention has been described in detail and with reference to specific embodiments thereof, it will be apparent to one skilled in the art that various changes and modifications can be made therein without departing from the spirit and scope thereof.

What is claimed is:

1. A heat-developable color photographic material comprising a support having thereon at least a light-sensitive silver halide, a hydrophilic binder and a dye releasing redox compound represented by the following general formula (I):

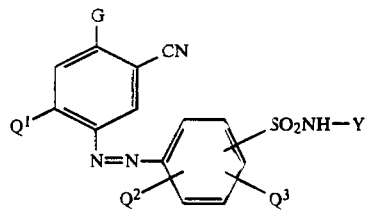

wherein $Q^1$ represents a hydrogen atom, a halogen atom, an alkoxy group, a substituted alkoxy group, an acylamino group represented by the formula —NHCOR$^1$ (wherein R$^1$ represents an alkyl group, a substituted alkyl group, an alkoxy group, a substituted alkoxy group, an amino group, a substituted amino group, an aryl group or a substituted aryl group) or a sulfonylamino group represented by the formula —NHSO$_2$R$^1$ (wherein R$^1$ has the same meaning as defined above); $Q^2$ and $Q^3$, which may be the same or different, each represents a hydrogen atom, a halogen atom, an alkyl group, a substituted alkyl group, an alkoxy group, a substituted alkoxy group or an amino group represented by the formula

(wherein R$_2$ and R$^3$, which may be the same or different, each represents an alkyl group or a substituted alkyl group or R$^2$ and R$^3$ may combine with each other and represent an atomic group necessary to form a 5-membered or 6-membered heterocyclic ring); G represents a hydroxy group or a group capable of providing a hydroxy group upon hydrolysis; and Y represents a group represented by the following general formulae (II) to (IX):

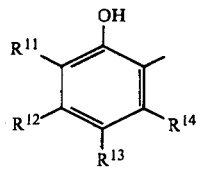

(II)

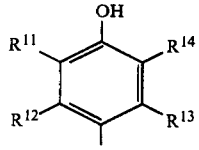

(III)

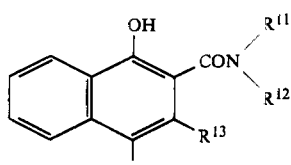

(IV)

-continued

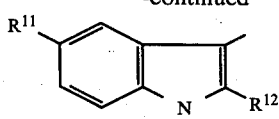 (V)

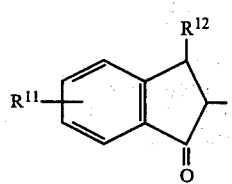 (VI)

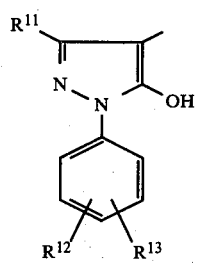 (VII)

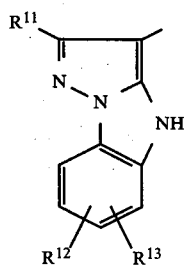 (VIII)

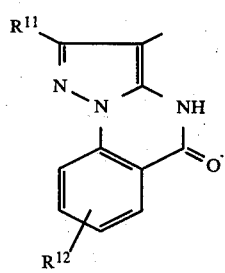 (IX)

wherein $R^{11}$, $R^{12}$, $R^{13}$ and $R^{14}$ each represents a hydrogen atom or a substituent selected from an alkyl group, a cycloalkyl group, an aryl group, an alkoxy group, an aryloxy group, an aralkyl group, an acyl group, an acylamino group, an alkylsulfonylamino group, an arylsulfonylamino group, an aryloxyalkyl group, an alkoxyalkyl group, an N-substituted carbamoyl group, an N-substituted sulfamoyl group, a halogen atom, an alkylthio group or an arylthio group, and the alkyl moiety and the aryl moiety in the above-described substituents may be further substituted with an alkoxy group, a halogen atom, a hydroxy group, a cyano group, an acyl group, an acylamino group, a substituted carbamoyl group, a substituted sulfamoyl group, an alkylsulfonylamino group, an arylsulfonylamino group, a substituted ureido group or a carboalkoxy group, and the hydroxy group and the amino group included in Y may be protected by a protective group capable of reproducing the hydroxy group and the amino group by the action of a nucleophilic agent.

2. A heat-developable color photographic material as claimed in claim 1, wherein the dye releasing redox compound is represented by the following general formula (Ia):

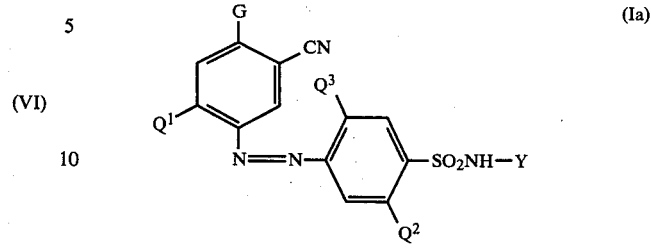

wherein $Q^1$, $Q^2$, $Q^3$, G and Y each has the same meaning as defined in claim 1.

3. A heat-developable color photographic material as claimed in claim 2, wherein $Q^1$ represents a hydrogen atom.

4. A heat-developable color photographic material as claimed in claim 1, wherein the dye releasing redox compound is represented by the following general formula (Ib):

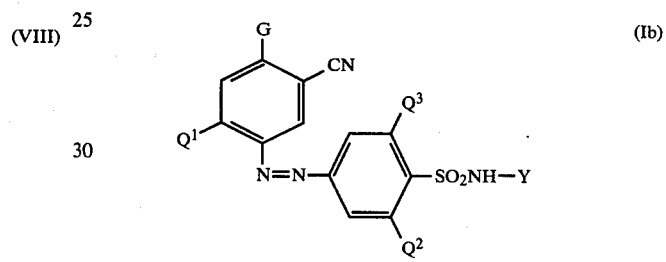

wherein $Q^1$, $Q^2$, $Q^3$, G and Y each has the same meaning as defined in claim 1.

5. A heat-developable color photographic material as claimed in claim 4, wherein $Q^1$ represents a hydrogen atom.

6. A heat-developable color photographic material as claimed in claim 1, wherein the dye releasing redox compound is represented by the following general formula (Ic):

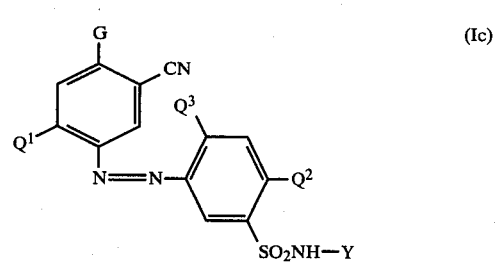

wherein $Q^1$, $Q^2$, $Q^3$, G and Y each has the same meaning as defined in claim 1.

7. A heat-developable color photographic material as claimed in claim 6, wherein $Q^1$ represents a hydrogen atom.

8. A heat-developable color photographic material as claimed in claim 1, wherein the alkoxy group represented by $Q^1$ is an alkoxy group having from 1 to 8 carbon atoms.

9. A heat-developable color photographic material as claimed in claim 1, wherein the substituted alkoxy group represented by $Q^1$ is a substituted alkoxy group having from 1 to 10 carbon atoms in total and is substituted with an alkoxy group or a halogen atom.

10. A heat-developable color photographic material as claimed in claim 1, wherein $Q^1$ is an acylamino group represented by the formula $-NHCOR^1$ wherein $R^1$ represents an alkyl group having from 1 to 8 carbon atoms, a substituted alkyl group having from 1 to 8 carbon atoms in the alkyl moiety, an alkoxy group having from 1 to 8 carbon atoms, a substituted alkoxy group having from 1 to 10 carbon atoms in total, an amino group, a substituted amino group substituted with an alkyl group or a substituted alkyl group each having from 1 to 10 carbon atoms, a phenyl group or a substituted phenyl group having from 6 to 9 carbon atoms.

11. A heat-developable color photographic material as claimed in claim 1, wherein $Q^1$ is a sulfonylamino group represented by the formula $-NHSO_2R^1$ wherein $R^1$ represents an alkyl group having from 1 to 8 carbon atoms, a substituted alkyl group having from 1 to 8 carbon atoms in the alkyl moiety, an alkoxy group having from 1 to 8 carbon atoms, a substituted alkoxy group having from 1 to 10 carbon atoms in total, an amino group, a substituted amino group substituted with an alkyl group or a substituted alkyl group each having from 1 to 10 carbon atoms, a phenyl group or a substituted phenyl group having from 6 to 9 carbon atoms.

12. A heat-developable color photographic material as claimed in claim 1, wherein the alkyl group represented by $Q^2$ or $Q^3$ is an alkyl group having from 1 to 8 carbon atoms.

13. A heat-developable color photographic material as claimed in claim 1, wherein the substituted alkyl group represented by $Q^2$ or $Q^3$ is a substituted alkyl group having from 1 to 10 carbon atoms in total and is substituted with an alkoxy group or a halogen atom.

14. A heat-developable color photographic material as claimed in claim 1, wherein the alkoxy group represented by $Q^2$ or $Q^3$ is an alkoxy group having from 1 to 8 carbon atoms in the alkyl moiety.

15. A heat-developable color photographic material as claimed in claim 1, wherein the substituted alkoxy group represented by $Q^2$ or $Q^3$ is a substituted alkoxy group having from 1 to 10 carbon atoms in total and is substituted with an alkoxy group or a halogen atom.

16. A heat-developable color photographic material as claimed in claim 1, wherein the amino group represented by $Q^2$ or $Q^3$ is an amino group represented by the formula

wherein $R^2$ and $R^3$ each represents an alkyl group having from 1 to 6 carbon atoms or a substituted alkyl group having from 1 to 10 carbon atoms in total and is substituted with an alkoxy group or a halogen atom.

17. A heat-developable color photographic material as claimed in claim 1, wherein the atomic group necessary to form a 5-membered or 6-membered heterocyclic ring of connecting $R^2$ and $R^3$ is a carbon atom chain or a carbon atom chain including an oxygen atom.

18. A heat-developable color photographic material as claimed in claim 1, wherein $Q^1$ represents an alkoxy group, an acylamino group or a sulfonylamino group.

19. A heat-developable color photographic material as claimed in claim 1, wherein G represents an alkali metal salt of a hydroxy group or a photographically inert ammonium salt of a hydroxy group.

20. A heat-developable color photographic material as claimed in claim 1, wherein G represents a hydrolyzable acyloxy group represented by the formula

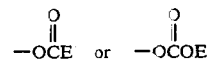

wherein E represents an alkyl group, a substituted alkyl group, a phenyl group or a substituted phenyl group.

21. A heat-developable color photographic material as claimed in claim 1, wherein the group represented by Y contains a ballast group.

22. A heat-developable color photographic material as claimed in claim 21, wherein the ballast group contains a hydrophobic group having from 8 to 32 carbon atoms.

23. A heat-developable color photographic material as claimed in claim 1, wherein an amount of the dye releasing redox compound is from 0.01 mol to 4 mols per mol of the silver.

24. A heat-developable color photographic material as claimed in claim 1, wherein the color photographic material further contains a reducing agent.

25. A heat-developable color photographic material as claimed in claim 24, wherein the reducing agent is an auxiliary developing agent.

26. A heat-developable color photographic material as claimed in claim 25, wherein an amount of the auxiliary developing agent is from 0.01 time to 20 times by mol based on the silver halide.

27. A heat-developable color photographic material as claimed in claim 1, wherein the light-sensitive silver halide is silver chloride, silver chlorobromide, silver chloroiodide, silver bromide, silver iodobromide, silver chloroiodobromide or silver iodide.

28. A heat-developable color photographic material as claimed in claim 1, wherein the light-sensitive silver halide is silver chloroiodide, silver iodobromide or silver chloroiodobromide each containing silver iodide crystal in its particle.

29. A heat-developable color photographic material as claimed in claim 1, wherein the particle size of the silver halide is from 0.001 μm to 2 μm.

30. A heat-developable color photographic material as claimed in claim 1, wherein the light-sensitive silver halide and the dye releasing redox compound are present in the same layer.

31. A heat-developable color photographic material as claimed in claim 1, wherein the color photographic material further contains an organic silver salt oxidizing agent.

32. A heat-developable color photographic material as claimed in claim 31, wherein the organic silver salt oxidizing agent is a silver salt which forms silver by reacting with the dye releasing redox compound, when it is heated to a temperature of above 80° C. in the presence of exposed silver halide.

33. A heat-developable color photographic material as claimed in claim 31, wherein the organic silver salt oxidizing agent is a silver salt of an organic compound having a carboxy group, a silver salt of a compound containing a mercapto group or a thione group or a silver salt of a compound containing an imino group.

34. A heat-developable color photographic material as claimed in claim 31, wherein the organic silver salt oxidizing agent is a silver salt of carboxylic acid derivative or an N-containing heterocyclic compound.

35. A heat-developable color photographic material as claimed in claim 34, wherein the organic silver salt oxidizing agent is an N-containing heterocyclic compound.

36. A heat-developable color photographic material as claimed in claim 31, wherein the organic silver salt oxidizing agent is present in a range from 0.1 mol to 200 mols per mol of the light-sensitive silver halide.

37. A heat-developable color photographic material as claimed in claim 31, wherein the light-sensitive silver halide and the organic silver salt oxidizing agent are present in the same layer.

38. A heat-developable color photographic material as claimed in claim 1, wherein the hydrophilic binder is gelatin or a gelatin derivative.

39. A heat-developable color photographic material as claimed in claim 1, wherein the color photographic material further contains a dye releasing activator.

40. A heat-developable color photographic material as claimed in claim 39, wherein the dye releasing activator is a substance which attacks nucleophilically a dye releasing redox compound oxidized by a silver halide or an organic silver salt oxidizing agent to release a diffusible dye.

41. A heat-developable color photographic material as claimed in claim 39, wherein the dye releasing activator is a base, a base releasing agent or a water releasing compound.

42. A heat-developable color photographic material as claimed in claim 39, wherein an amount of the dye releasing activator is from 1/100 to 10 times by molar ratio based on silver.

43. A heat-developable color photographic material as claimed in claim 1, wherein the color photographic material further contains a thermal solvent.

44. A heat-developable color photographic material as claimed in claim 1, wherein the color photographic material further comprises an image receiving layer capable of receiving a hydrophilic diffusible dye.

45. A heat-developable color photographic material as claimed in claim 44, wherein the image receiving layer contains a dye mordant.

46. A heat-developable color photographic material as claimed in claim 44, wherein the image receiving layer contains a polymer mordant and gelatin.

47. A heat-developable color photographic material as claimed in claim 1, wherein the color photographic material further contains a transfer solvent.

48. A heat-developable color photographic material as claimed in claim 47, wherein the transfer solvent is water, an alkaline aqueous solution, an organic solvent having a low boiling point or a mixture thereof.

49. A method of forming a color image, comprising the steps of:
imagewise exposing a heat-developable color photographic material comprising a support having thereon a light-sensitive silver halide, a hydrophilic binder and a dye releasing redox compound represented by the general formula (I):

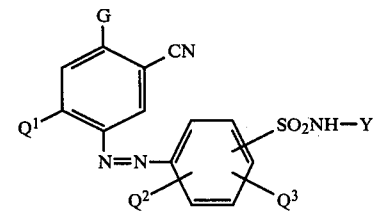

wherein $Q^1$ represents a hydrogen atom, a halogen atom, an alkoxy group, a substituted alkoxy group, an acylamino group represented by the formula —NH-COR$^1$ (wherein $R^1$ represents an alkyl group, a substituted alkyl group, an alkoxy group, a substituted alkoxy group, an amino group, a substituted amino group, an aryl group or a substituted aryl group) or a sulfonylamino group represented by the formula —NH-SO$_2$R$^1$ (wherein $R^1$ has the same meaning as defined above); $Q^2$ and $Q^3$, which may be the same or different, each represents a hydrogen atom, a halogen atom, an aryl group, a substituted alkyl group, an alkoxy group, a substituted alkoxy group or an amino group represented by the formula

(wherein $R^2$ and $R^3$, which may be the same or different, each represents an alkyl group or a substituted alkyl group or $R^2$ and $R^3$ may combine with each other and represent an atomic group necessary to form a 5-membered or 6-membered heterocyclic ring); G represents a hydroxy group or a group capable of providing a hydroxy group upon hydrolysis; and Y represents a group represented by the following general formulae (II) to (IX):

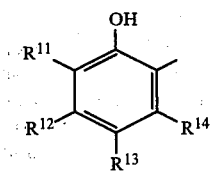

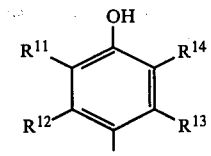

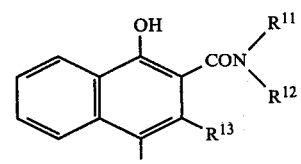

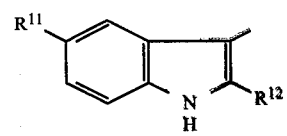

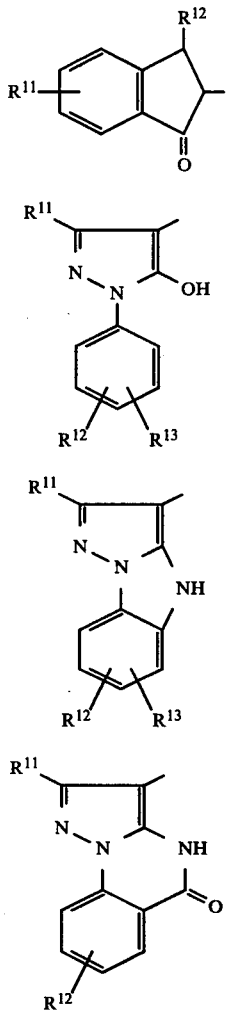

wherein R¹¹, R¹², R¹³ and R¹⁴ each represents a hydrogen atom or a substituent selected from an alkyl group, a cycloalkyl group, an aryl group, an alkoxy group, an arloxy group, an aralkyl group, an acyl group, an acylamino group, an alkylsulfonylamino group, an arylsulfonylamino group, an aryloxyalkyl group, an alkoxyalkyl group, an N-substituted carbamoyl group, an N-substituted sulfamoyl group, a halogen atom, an alkylthio group or an arylthio group, and the alkyl moiety and the aryl moiety in the above-described substituents may be further substituted with an alkoxy group, a halogen atom, a hydroxy group, a cyano group, an acyl group, an acylamino group, a substituted carbamoyl group, a substituted sulfamoyl group, an alkylsulfonylamino group, an arylsulfonylamino group, a substituted ureido group or a carboalkoxy group, and the hydroxy group and the amino group included in Y may be protected by a protective group capable of reproducing the hydroxy group and the amino group by the action of a nucleophilic agent;

developing the imagewise exposed photographic material by heating the material to a temperature of from 80° C. to 250° C. to release a hydrophilic diffusible dye; and transferring the diffusible dye into an image receiving material.

50. A method of forming a color image as claimed in claim 49, wherein the transferring of the diffusible dye is carried out using a transfer solvent.

51. A method of forming a color image as claimed in claim 50, wherein the transfer solvent is selected from the group consisting of water, an alkaline aqueous solution, an organic solvent having a low boiling point and a mixture thereof.

52. A method of forming a color image as claimed in claim 50, wherein the transfer solvent is selected from the group consisting of water and an alkaline aqueous solution.

53. A method of forming a color image as claimed in claim 49, wherein the transferring of the diffusible dye is carried out at a temperature from about 25° C. to a temperature not less than 40° C. lower than the heat developing temperature.

54. A method of forming a color image as claimed in claim 49, wherein the image receiving material contains a mordant for the diffusible dye.

55. A method of forming a color image as claimed in claim 54, wherein the mordant for the diffusible dye is a polymer mordant.

56. A method of forming a color image as claimed in claim 49, wherein the image receiving material comprises a support and an image receiving layer containing a polymer mordant and gelatin.

57. A method of forming a color image as claimed in claim 56, wherein the image receiving layer further contains water or an alkaline aqueous solution.

* * * * *